(12) United States Patent
Yamamoto et al.

(10) Patent No.: US 7,466,448 B2
(45) Date of Patent: Dec. 16, 2008

(54) COLOR SEPARATION INTO PLURAL INK COMPONENTS INCLUDING PRIMARY COLOR INK AND SPOT COLOR INK

(75) Inventors: Yuko Yamamoto, Nagano-ken (JP); Koichi Yoshizawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 865 days.

(21) Appl. No.: 10/788,248

(22) Filed: Feb. 25, 2004

(65) Prior Publication Data
US 2005/0052666 A1 Mar. 10, 2005

(30) Foreign Application Priority Data
Feb. 28, 2003 (JP) .............................. 2003-053359

(51) Int. Cl.
*H04N 1/60* (2006.01)
(52) U.S. Cl. .................. 358/1.9; 358/3.06; 358/3.28; 382/100; 382/162
(58) Field of Classification Search .............. 358/1.9, 358/3.06, 3.28; 382/100, 162
See application file for complete search history.

(56) References Cited

U.S. PATENT DOCUMENTS

2002/0097412 A1* 7/2002 Shibata et al. ............... 358/1.9

FOREIGN PATENT DOCUMENTS

| JP | 08-085219 | 4/1996 |
|---|---|---|
| JP | 10-191089 | 7/1998 |
| JP | 2001-069361 | 3/2001 |
| JP | 2001-232860 | 8/2001 |
| JP | 2001-354886 | 12/2001 |
| JP | 2002-154239 | 5/2002 |
| JP | 2002-335413 | 11/2002 |

OTHER PUBLICATIONS

Abstract of Japanese Patent Publication No. 2001-354886, Pub. Date: Dec. 25, 2001.
Abstract of Japanese Patent Publication No. 2002-335413, Pub. Date: Nov. 22, 2002.
Abstract of Japanese Patent Publication No. 08-085219, Pub. Date: Apr. 2, 1996, Patent Abstracts of Japan.

(Continued)

*Primary Examiner*—King Poon
*Assistant Examiner*—Nathan K Tyler
(74) *Attorney, Agent, or Firm*—Martine Penilla & Gencarella, LLP

(57) ABSTRACT

An ink set that includes a plurality of chromatic primary color inks that can reproduce achromatic color in combination with each other and at least one spot color ink having a hue different from any of the chromatic primary color inks is prepared. A color to be reproduced on a printing medium in accordance with a given input color is termed a reproduction color, and a combination of ink amounts for inks in the ink set to be used to reproduce the reproduction color on the printing medium is termed a color separation ink amount set. When a saturation parameter value that is correlated with the saturation of the reproduction color falls within a first range that is close to achromaticity, the ink amount of the spot color ink included in the color separation ink amount set is adjusted such that it decreases in accordance with a change in the saturation parameter value in the direction of lower saturation.

16 Claims, 21 Drawing Sheets

OTHER PUBLICATIONS

Abstract of Japanese Patent Publication No. 2001-069361, Pub. Date: Mar. 16, 2001, Patent Abstracts of Japan.
Abstract of Japanese Patent Publication No. 2001-232860, Pub. Date: Aug. 28, 2001, Patent Abstracts of Japan.
Abstract of Japanese Patent Publication No. 2002-154239, Pub. Date: May 28, 2002, Patent Abstracts of Japan.
Abstract of Japanese Patent Publication No. 10-191089, Pub. Date: Jul. 21, 1998, Patent Abstracts of Japan.

* cited by examiner

Fig.5(a)

| INK | | Y | M | C | R | V | K |
|---|---|---|---|---|---|---|---|
| COLORANT | TYPE(C.I.) | PY128 | PR122 | PB15:3 | PO43 | PV23 | PBk7 |
| | CONCENTRATION | 2.0 | 2.0 | 1.5 | 2.0 | 2.0 | 2.0 |
| DISPERSION AGENT | | 1.0 | 1.0 | 1.0 | 1.0 | 1.0 | 1.0 |
| GLYCERIN | | 15.0 | 15.0 | 15.0 | 15.0 | 15.0 | 15.0 |
| ETHYLENE GLYCOL | | 5.0 | 5.0 | 5.0 | 5.0 | 5.0 | 5.0 |
| 2-PROPYLENE | | 2.0 | 2.0 | 2.0 | 2.0 | 2.0 | 2.0 |
| 1,2-HEXANEDIOL | | 5.0 | 5.0 | 5.0 | 5.0 | 5.0 | 5.0 |
| SURFYNOL E1010 | | 0.5 | 0.5 | 0.5 | 0.5 | 0.5 | 0.5 |
| ION EXCHANGE WATER | | REMAINDER | REMAINDER | REMAINDER | REMAINDER | REMAINDER | REMAINDER |

(PERCENTAGE BY WEIGHT)

DISPERSION AGENT: STYRENE-ACRYLATE COPOLYMER

PY : PIGMENT YELLOW
PR : PIGMENT RED
PB : PIGMENT BLUE
PO : PIGMENT ORANGE
PV : PIGMENT VIOLET
PBk: PIGMENT BLACK

Fig.5(b)

| R | wCR | wMR | wYR | TOTAL CMY |
|---|---|---|---|---|
| 1.0 | 0.0 | 0.71 | 2.86 | 3.57 |

Fig.5(c)

| V | wCV | wMV | wYV | TOTAL CMY |
|---|---|---|---|---|
| 1.0 | 0.68 | 2.89 | 0.0 | 3.57 |

$$k = \frac{Rtmp}{Rmax}$$

$$SR = \max(Ci, Mi, Yi) - \min(Ci, Mi, Yi)$$

$V = C + M$ $C \leqq 80$
$M \leqq 80$
$V \leqq 80$
$C + M + V \leqq 200$ $$x = \frac{Rtmp}{Rp}$$

$$SR2 = \max(Cm, Mm, Ym) - \min(Cm, Mm, Ym)$$

Fig.21(a)

| | INK | Y | M | C | R | V |
|---|---|---|---|---|---|---|
| COLORANT | TYPE (C.I.) | PY128 | PR122 | PB15:3 | PR178 | PB60 |
| | CONCENTRATION | 2.0 | 2.0 | 1.5 | 2.0 | 4.0 |

(PERCENTAGE BY WEIGHT)

Fig.21(b)

| R | wCR | wMR | wYR | TOTAL CMY |
|---|---|---|---|---|
| 1.0 | 0.0 | 1.58 | 1.05 | 2.63 |

Fig.21(c)

| V | wCV | wMV | wYV | TOTAL CMY |
|---|---|---|---|---|
| 1.0 | 1.25 | 0.83 | 0.0 | 2.08 |

Fig.22(a)

| | INK | Y | M | C | R | V |
|---|---|---|---|---|---|---|
| COLORANT | TYPE (C.I.) | PY74 | PR122 | PB15:3 | PO43 | PV23 |
| | CONCENTRATION | 4.0 | 4.0 | 5.0 | 2.0 | 2.0 |

(PERCENTAGE BY WEIGHT)

Fig.22(b)

| R | wCR | wMR | wYR | TOTAL CMY |
|---|---|---|---|---|
| 1.0 | 0.0 | 0.44 | 1.38 | 1.82 |

Fig.22(c)

| V | wCV | wMV | wYV | TOTAL CMY |
|---|---|---|---|---|
| 1.0 | 1.28 | 4.28 | 0.0 | 5.56 |

Fig.23(a)

| INK | | Y | M | C | R | V |
|---|---|---|---|---|---|---|
| COLORANT | TYPE (C.I.) | PY74 | PR122 | PB15:3 | PR178 | PB60 |
| | CONCENTRATION | 4.0 | 4.0 | 5.0 | 2.0 | 4.0 |

(PERCENTAGE BY WEIGHT)

Fig.23(b)

| R | wCR | wMR | wYR | TOTAL CMY |
|---|---|---|---|---|
| 1.0 | 0.0 | 1.31 | 0.41 | 1.72 |

Fig.23(c)

| V | wCV | wMV | wYV | TOTAL CMY |
|---|---|---|---|---|
| 1.0 | 2.20 | 0.30 | 0.0 | 2.50 |

Fig.24(a)

| INK | | Y | M | C | R | V |
|---|---|---|---|---|---|---|
| COLORANT | TYPE (C.I.) | PY128 | PR122 | PB15:3 | PO43 | PV23 |
| | CONCENTRATION | 4.0 | 3.0 | 2.0 | 2.0 | 2.0 |

(PERCENTAGE BY WEIGHT)

Fig.24(b)

| R | wCR | wMR | wYR | TOTAL CMY |
|---|---|---|---|---|
| 1.0 | 0.0 | 0.81 | 1.89 | 2.70 |

Fig.24(c)

| V | wCV | wMV | wYV | TOTAL CMY |
|---|---|---|---|---|
| 1.0 | 0.70 | 2.24 | 0.0 | 2.94 |

Fig.25(a)

| COLORANT | INK | Y | M | C | R | V |
|---|---|---|---|---|---|---|
| | TYPE (C.I.) | PY128 | PR122 | PB15:3 | PR178 | PB60 |
| | CONCENTRATION | 4.0 | 3.0 | 2.0 | 2.0 | 4.0 |

(PERCENTAGE BY WEIGHT)

Fig.25(b)

| R | wCR | wMR | wYR | TOTAL CMY |
|---|---|---|---|---|
| 1.0 | 0.0 | 1.26 | 0.62 | 1.88 |

Fig.25(c)

| V | wCV | wMV | wYV | TOTAL CMY |
|---|---|---|---|---|
| 1.0 | 1.33 | 0.70 | 0.0 | 2.03 |

Fig.26(a)

| COLORANT | INK | Y | M | C | R | V |
|---|---|---|---|---|---|---|
| | TYPE (C.I.) | PY128 | PR122 | PB15:3 | PR178 | PV23 |
| | CONCENTRATION | 2.0 | 2.0 | 1.5 | 2.0 | 2.0 |

(PERCENTAGE BY WEIGHT)

Fig.26(b)

| R | wCR | wMR | wYR | TOTAL CMY |
|---|---|---|---|---|
| 1.0 | 0.0 | 1.58 | 1.05 | 2.63 |

Fig.26(c)

| V | wCV | wMV | wYV | TOTAL CMY |
|---|---|---|---|---|
| 1.0 | 0.68 | 2.89 | 0.0 | 3.57 |

Fig.27

| INK | | Y | M | C | R | V |
|---|---|---|---|---|---|---|
| COLORANT | TYPE (C.I.) | PY74 | PR202 | PB15:3 | PR178 | PV23 |
| | CONCENTRATION | 3.0 | 1.5 | 1.5 | 2.0 | 2.0 |

(PERCENTAGE BY WEIGHT)

Fig.28

| INK | | Y | M | C | R | V |
|---|---|---|---|---|---|---|
| COLORANT | TYPE (C.I.) | PY74 | PV19 | PB15:3 | PR177 | PV23 |
| | CONCENTRATION | 3.0 | 2.0 | 1.5 | 2.5 | 2.0 |

(PERCENTAGE BY WEIGHT)

COLOR SEPARATION INTO PLURAL INK COMPONENTS INCLUDING PRIMARY COLOR INK AND SPOT COLOR INK

BACKGROUND OF THE INVENTION

1. Field of the Invention

This invention relates to a color printing technology employing a plurality of ink.

2. Description of the Related Art

In recent years, color inkjet printers have become widely used as image output apparatuses. An ordinary color inkjet printer uses multiple colors of ink, including the colors cyan (C), magenta (M) and yellow (Y) in addition to black (K). Any desired colors in a color image can be reproduced using these multiple types of ink.

In this type of printer, the amount of each type of usable ink that will be used is determined in accordance with the desired color in the color image. In this Specification, the process by which the amount of each ink used in order to reproduce a color during printing is termed "color separation" or "ink color separation". The relationship between the color data for the color image and the amount of each color ink is stored beforehand in a color conversion lookup table (hereinafter "LUT"), and during printing, the amount of ink output is determined for each color ink for each pixel position with reference to the LUT. (See, for example, JP10-191089A.)

Color reproduction by the printer is determined based on the types of ink usable by the printer. Typically, any desired colors can be reproduced by combining three chromatic primary color inks (such as cyan (C), magenta (M) and yellow (Y), for example). In some cases, spot color inks having a hue different from any of these chromatic primary color inks may be used. Here, "spot color" means a color that can be separated into two chromatic primary color components. When spot color inks are used, color reproducibility can be improved for image areas having a hue that is close to any of the colors of the spot color inks. However, where both the chromatic primary and spot color inks described above are available, color separation processing that seeks to minimize the use of the spot color inks has not been incorporated into the conventional art.

SUMMARY OF THE INVENTION

An object of the present invention is to perform color separation processing to minimize the use of spot color inks where both chromatic primary color inks and spot color inks are available.

According to one aspect of the invention, a color separation method is provided that determines amounts of a plurality of color inks in order to reproduce a arbitrary color with the plurality of color inks on a printing medium. The method comprises the steps of: (a) defining an ink set that includes as useable inks a plurality of chromatic primary color inks that when used in combination can reproduce achromatic color, and at least one spot color ink of hue different from any of the plurality of chromatic primary color inks; (b) determining a plurality of reproduction colors to be reproduced on a print medium according to a plurality of input colors within a chromatic primary color space, a term "reproduction color" denoting a color to be reproduced on the print medium according to any one input color, a term "color separation ink amount set" denoting a combination of ink amounts of the ink set for reproducing a reproduction color on the print medium, a term "chromatic primary color space" denoting a color space having base vectors representing ink amounts of the plurality of chromatic primary color inks; and (c) determining a plurality of color separation ink amount sets for reproducing the plurality of reproduction colors. The step (c) includes, for each reproduction color, the steps of: (c1) calculating a color saturation parameter value correlated to saturation of the reproduction color; and (c2) adjusting an ink amount of the spot color ink in the color separation ink amount set for the reproduction color such that the ink amount of the spot color ink decreases as the saturation parameter value changes in a direction of lower saturation when the color saturation parameter value falls within a prescribed first low-saturation range that is close to achromaticity.

According to this color separation method, because the chromatic primary color inks can be deliberately used instead of the spot color ink when the saturation parameter value falls within a low-saturation range close to achromaticity, the use of the spot color ink can be conserved.

This invention can be realized in various forms, and may take the form of, for example, a image data conversion method and apparatus, printing method and apparatus or color conversion lookup table creation method and apparatus that use the above color separation method, a computer program that implements the functions of these methods or apparatuses, a recording medium on which such computer program is recorded, or data signals that include this computer program and are encoded in a carrier wave.

These and other objects, features, aspects and advantages of the present invention will be clarified based on the descriptions of the preferred embodiments provided below with reference to the drawings.

BRIEF DESCRIPTION OF THE DRAWINGS

FIGS. 5(a)-5(c) are explanatory drawings showing an ink set.

FIGS. 21(a)-21(c) are explanatory drawings showing an ink set.

FIGS. 22(a)-22(c) are explanatory drawings showing an ink set.

FIGS. 23(a)-23(c) are explanatory drawings showing an ink set.

FIGS. 24(a)-24(c) are explanatory drawings showing an ink set.

FIGS. 25(a)-25(c) are explanatory drawings showing an ink set.

FIGS. 26(a)-26(c) are explanatory drawings showing an ink set.

FIG. 27 is an explanatory drawing showing an ink set.

FIG. 28 is an explanatory drawing showing an ink set.

DESCRIPTION OF THE PREFERRED EMBODIMENTS

Embodiments of the present invention are described in the order provided below based on examples.

Figure 1:
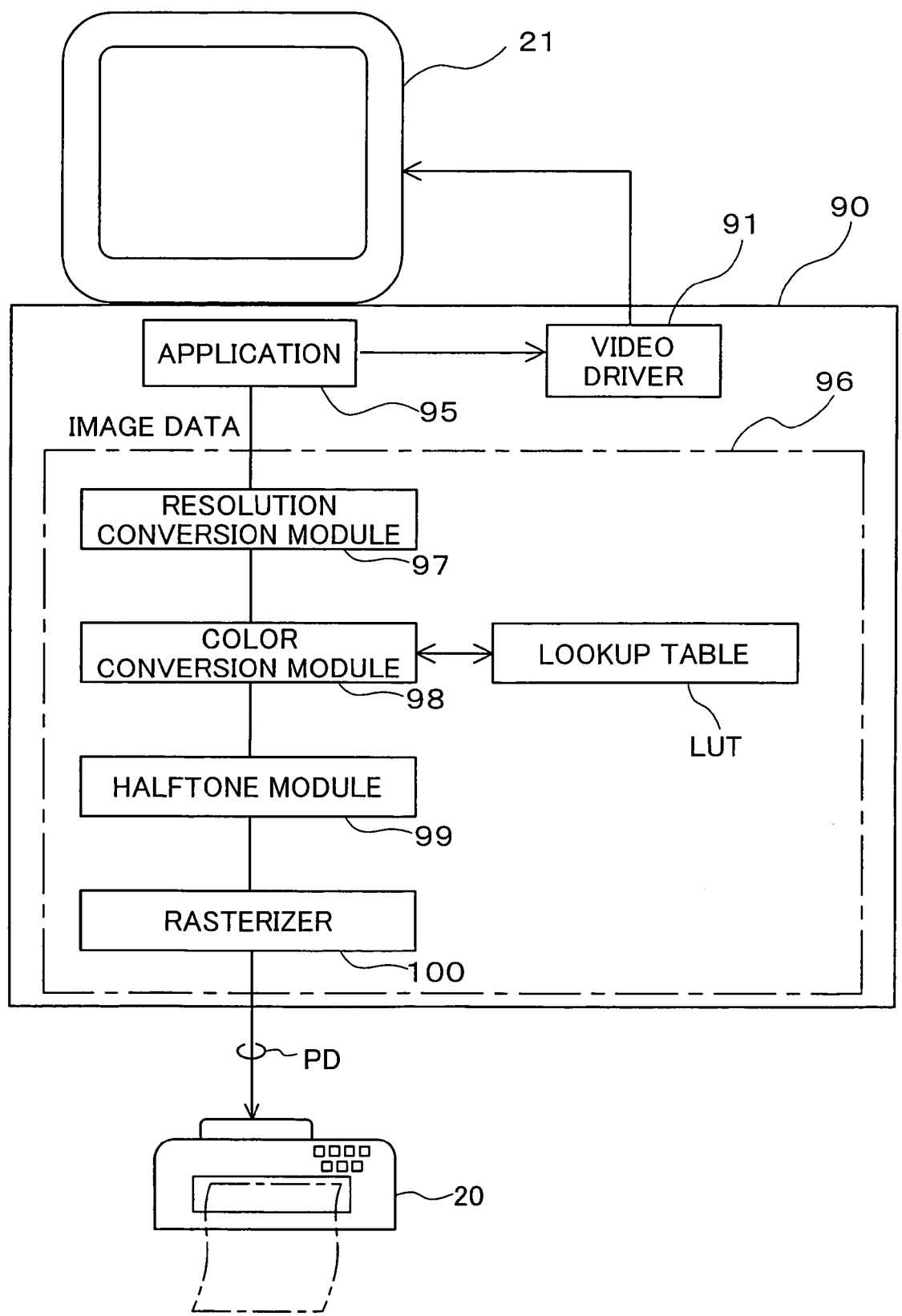
FIG. 1 is a block diagram showing the construction of a printing system.

A. Construction of apparatus
B. First embodiment of color separation process
C. Second embodiment of color separation process
D. Embodiments of final color separation ink amount set calculation process
E. Third embodiment of color separation process
F. Variations of ink set
G. Variations A. Construction of Apparatus FIG. 1 is a block diagram showing the construction of a printing system embodying the present invention. This printing system includes a computer 90 and a color printer 20 that serves as a printing device. The printer 20 and computer 90 may be collectively referred to as a "printing apparatus" in a broad sense of the term.

An application program 95 is run on the computer 90 under a prescribed operating system. The operating system incorporates a video driver 91 and a printer driver 96. Print data PD to be forwarded to the printer 20 via these drivers is output from the application program 95. The application program 95 that performs image editing and the like executes desired processing to the images to be processed and displays images on a CRT 21 via the video driver 91.

When the application program 95 issues a printing instruction, the printer driver 96 of the computer 90 receives image data from the application program 95 and converts it into print data PD to be supplied to the printer 20. In the example shown in FIG. 1, the printer driver 96 incorporates a resolution conversion module 97, color conversion module 98, halftone module 99, rasterizer 100 and color conversion lookup table LUT.

The resolution conversion module 97 converts the resolution of the color image data formed by the application program 95 (i.e., the number of pixels per unit of length) into a printing resolution. The resolution-converted image data still consists of image information including the three RGB color components. The color conversion module 98 converts the RGB image data (input color image data) for each pixel into multiple-tone data (second color image data) that can be expressed using the multiple ink colors available to the printer 20, with reference to the color conversion lookup table LUT.

The multiple-tone data obtained after color conversion has a resolution of 256 gradations, for example. The halftone module 99 executes so-called halftone processing to generate halftone image data. This halftone image data is rearranged in order of data to be forwarded to the printer 20 by the rasterizer 100, and is output as final print data PD. The print data PD includes raster data indicating the state of dot formation during each main scan and data indicating the amount of sub-scan to be performed.

The printer driver 96 is equivalent to a program that performs the functions of executing various image processes and generating the print data PD. The program that performs the functions of the printer driver 96 is provided in the form of a recording on a computer-readable recording medium. The recording medium may include any of various types of computer-readable recording media, such as a flexible disk, CD-ROM, opto-magnetic disk, IC card, ROM cartridge, punch card, or printed matter on which symbols such as a bar code are printed, an internal computer storage medium (memory such as a RAM or ROM) or an external storage medium.

Figure 2:
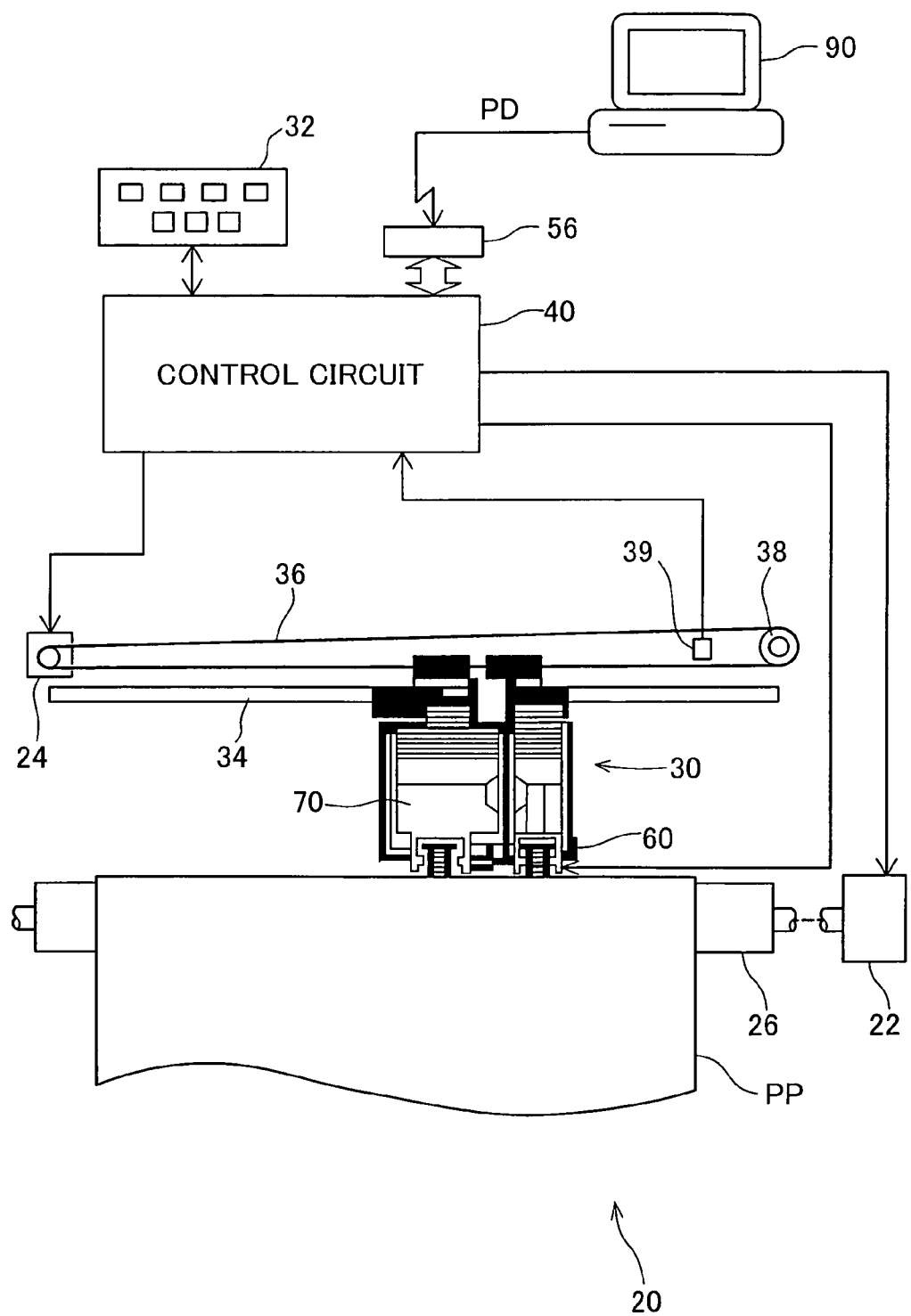
FIG. 2 is a drawing showing the basic construction of a printer 20.

FIG. 2 is a drawing showing the basic construction of the printer 20. The printer 20 includes a sub-scanning mechanism that forwards the printing paper PP in the sub-scanning direction via a paper feed motor 22, a main scanning mechanism that moves a carriage 30 back and forth axially along a platen 26 (the main scanning direction) via a carriage motor 24, a head driving mechanism that drives a print head unit 60 that is mounted to the carriage 30 to control ink discharge and dot formation, and a control circuit that sends and receives signals to and from the paper feed motor 22, carriage motor 24 and print head 60, as well as an operation panel 32. The control circuit 40 is connected to the computer 90 via a connector 56.

The sub-scanning mechanism that feeds the printing paper PP includes a gear train (not shown) that transmits the rotation of the paper feed motor 22 to the platen 26 and to paper conveyance rollers (also not shown). The main scanning mechanism that moves the carriage 30 back and forth includes a movement shaft 34 that is disposed parallel to the axis of the platen 26 and movably secures the carriage 30, a pulley 38 over which is secured an endless-loop driving belt that is mounted to the pulley 38 and the carriage motor 24, and a position sensor 39 that detects the origin position of the carriage 30.

Figure 3:
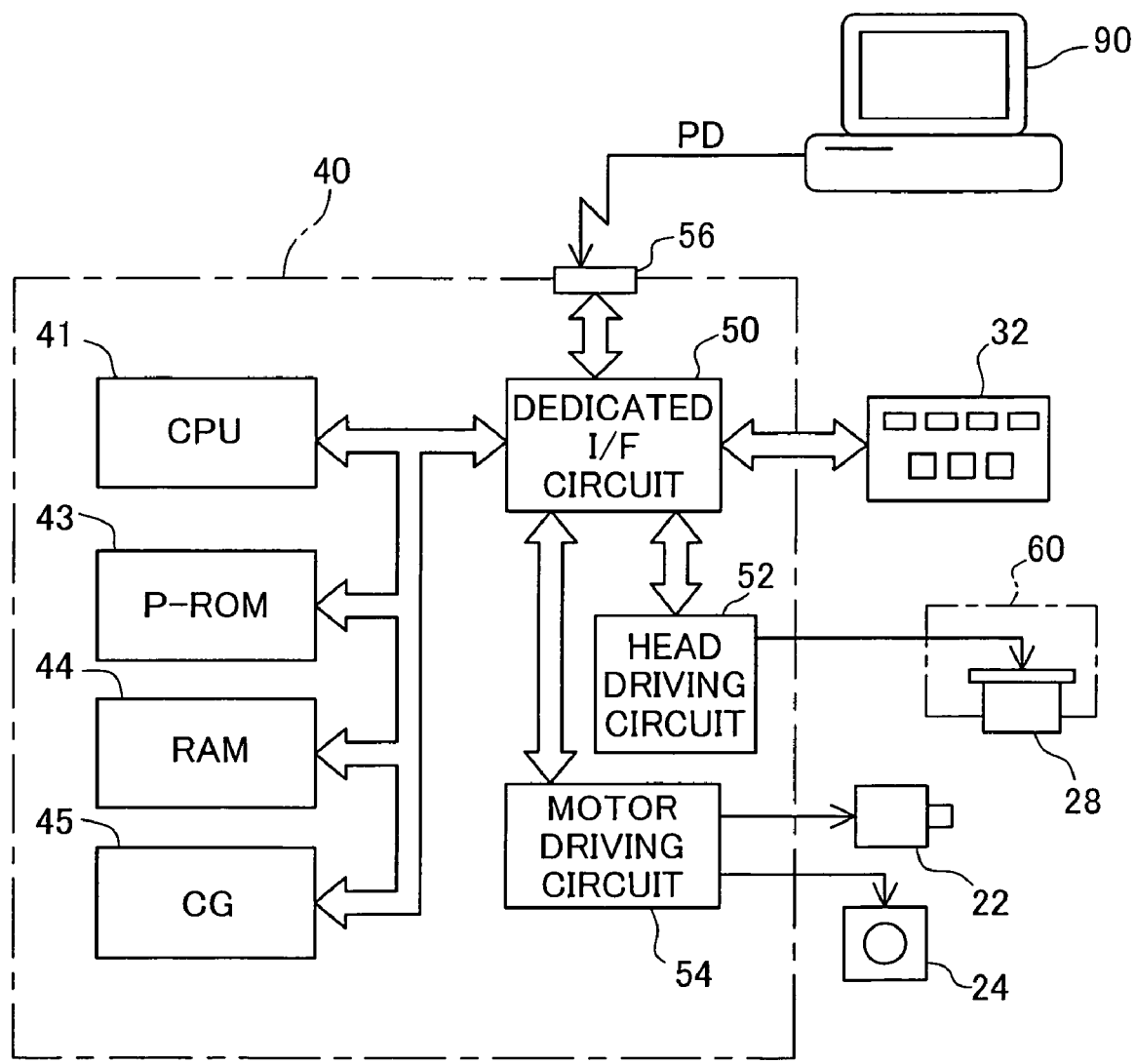
FIG. 3 is a block diagram showing the construction of the printer 20.

FIG. 3 is a block diagram showing the construction of the printer 20 focusing on the control circuit 40. The control circuit 40 includes an arithmetic logic circuit that includes a CPU 41, a programmable ROM (PROM) 43, a RAM 44, and a character generator (CG) 45 that stores a character dot matrix. The control circuit 40 further includes a dedicated I/F circuit 50 that is dedicated exclusively to interfacing with an external motor or the like, a head driving circuit 52 that is connected to the dedicated I/F circuit 50 and discharges ink drops via the driving of a print head unit 60, and a motor driving circuit 54 that drives the paper feed motor 22 and the carriage motor 24. The dedicated I/F circuit 50 has a parallel interface circuit and can receive the print data PD supplied by the computer 90 via the connector 56. The type of circuit integrated into the dedicated I/F circuit 50 is not limited to a parallel interface circuit, and may include a Universal Serial Bus circuit or the like, and may generally be determined taking into account such factors as ease of connection to the computer 90 and communication speed. The printer 20 executes printing based on the print data PD. The RAM 44 functions as a buffer memory for temporary storage of raster data.

The print head unit 60 has a print head 28 and accommodates installation of ink cartridges. The print head unit 60 can be installed in and removed from the printer 20 as a single component. In other words, in order to replace the print head 28, the entire print head unit 60 is replaced.

Figure 4:
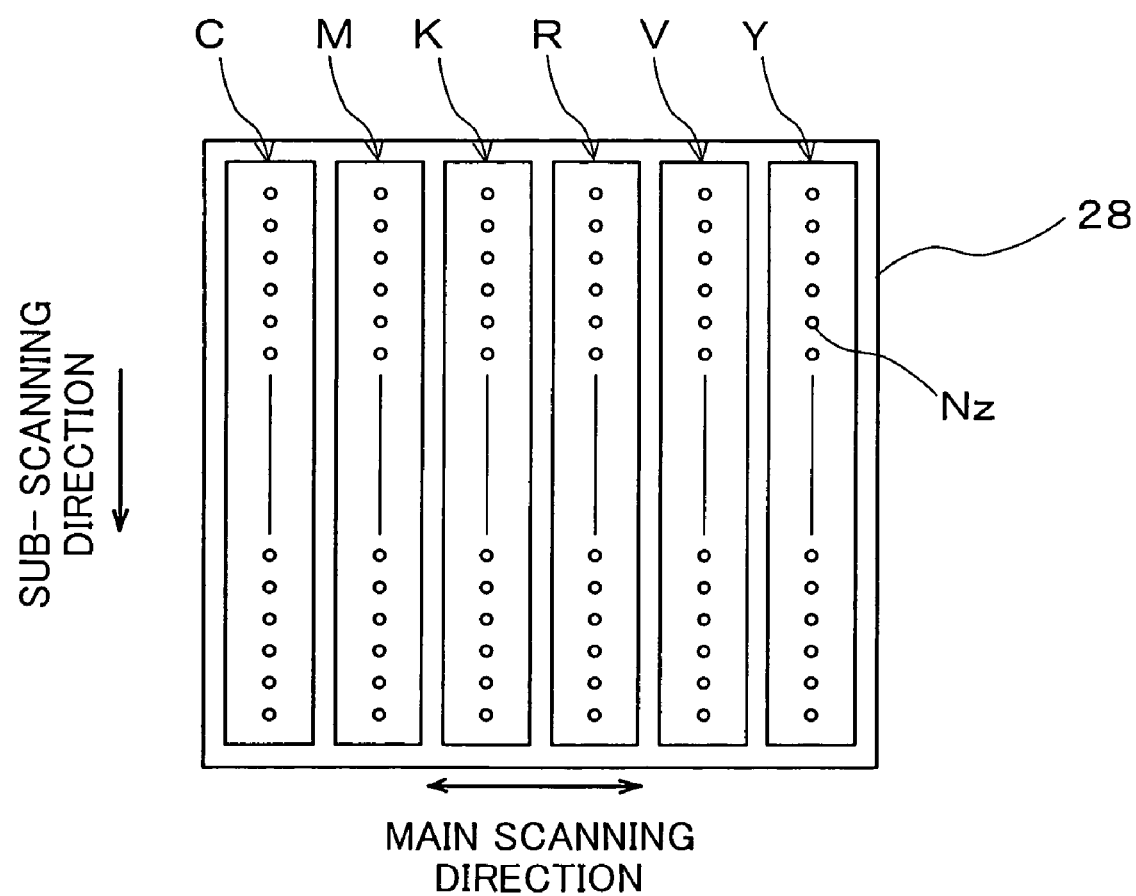
FIG. 4 is an explanatory drawing showing the nozzle arrangement on the bottom surface of a print head 28.

FIG. 4 is an explanatory drawing showing the arrangement of nozzles on the bottom surface of the print head 28. Formed on the bottom of the print head 28 are a group of nozzles that discharge cyan ink C, a group of nozzles that discharge magenta ink M, a group of nozzles that discharge black ink K, a group of nozzles that discharge red ink R, a group of nozzles that discharge violet ink V and a group of nozzles that discharge yellow ink Y. In this embodiment, an ink set including the six ink colors C, M, Y, R, V and K can be used. In the example of FIG. 4, the multiple nozzles Nz of any one nozzle group are aligned in a straight line along the sub-scanning direction SS, but they may also be arranged in a zig-zag fashion.

FIG. 5(*a*) is an explanatory drawing showing the color ink components C, M, Y, R, V and K of the ink set. Each color ink is ion exchange water-based, containing various kinds of colorant consisting of dyes or pigments to impart the desired color, or a mixed solution additionally containing a suitable amount of ethylene glycol or the like added to modify viscosity. The type of colorant is indicated by the color index (CI) of the colorant.

Cyan ink C, magenta ink M and yellow ink Y can reproduce gray or an achromatic color when used in combination, and correspond to chromatic primary color inks. Red ink R and violet ink V are inks having a hue different from any of the chromatic primary color inks (CMY) and correspond to spot color inks. Red ink R has a hue that falls between the hues of yellow ink Y and magenta ink M, and violet ink V has a hue that falls between the hues of magenta ink M and cyan ink C.

A color mixture resulting from a combination of the chromatic primary colors of C, M and Y can reproduce almost identical hue and saturation values as the values for the spot color inks R and V. Here, each ink quantity of chromatic primary color ink in a color mixture, relative to the ink quantity of a spot color ink, i.e., each ink quantity of chromatic primary color ink when the ink quantity of a spot color ink is designated as 1, is termed "substitution ink amount". If the R or V ink is replaced by the C, M and Y inks based on their substitution ink amounts, almost identical hue and saturation with the R or V ink can be reproduced.

FIGS. 5(*b*) and 5(*c*) show the results of experiments to measure substitution ink amount using the ink set shown in FIG. 5(*a*). These experimental results were obtained by measuring and comparing color patches created using mixtures of chromatic primary color inks C, M and Y and color patches created using the spot color inks R and V. FIG. 5(*b*) shows the substitution ink amounts for the red ink R, and the CMY substitution ink amounts are respectively designated wCR, wMR and wYR. FIG. 5(*c*) shows the substitution ink amounts for the violet ink V, and the CMY substitution ink amount are designated wCV, wMV and wYV. The column at the right side of either table indicates the total of the substitution ink amounts.

As shown in the tables, the respective substitution ink amounts of two of the three chromatic primary color inks for the spot colors of R and V are larger than zero, and zero for the other chromatic primary color ink amount. In other words, the spot colors R and V can be separated into two chromatic primary color components, respectively. Furthermore, using the ink set shown in FIG. 5(*a*), a color mixture of two chromatic primary color inks can be replaced by a spot color ink consisting of a smaller total amount of ink. As a result, by deliberately using a spot color ink, substantially identical hue and saturation can be reproduced using less total ink. Furthermore, by reducing the total amount of ink used, higher lightness can be achieved. Moreover, by using a spot color ink including around the same amount of ink as a mixture of primary color inks, higher saturation can be reproduced. Consequently, even where a restriction (ink duty limit) is imposed on the total amount of ink to be used as described in detail below, by using a spot color ink, a higher saturation can be reproduced than can be reproduced using a mixture of chromatic primary color inks. By using both chromatic primary color inks and spot color inks as described above, a wider range of colors can be reproduced than can be reproduced using chromatic primary color inks only.

The two spot color inks R and V have different hues. Furthermore, these inks R, V have different principal component primary color inks from one another; the principal component primary color inks denote the two inks that have the largest values of the substitution ink quantities among the color inks CMY. In the example of FIGS. 5(*b*) and 5(*c*), the principal component primary color inks for red ink R are magenta ink M and yellow ink Y. The principal component primary color inks for violet ink V are cyan ink C and magenta ink M. In this example, yellow ink Y is used only for red ink R while cyan ink C is used only for violet ink V. As a result, using the two spot color inks R and V, the color reproduction ranges for various hue areas can be expanded. Therefore, a wider range of colors can be reproduced than can be reproduced when spot color inks having similar hues are used.

Furthermore, using the ink set shown in FIG. 5(*a*), the spot color inks R and V contain different colorants than the chromatic primary color inks C, M and Y. Consequently, by using spot color inks instead of mixtures of the chromatic primary color inks C, M and Y, reproducibility of hues close to those of the spot color inks can be improved.

The printer 20 having the hardware construction described above forms multi-color, multiple-tone images on the printing paper PP by moving the carriage 30 back and forth via the carriage motor 24 while forwarding the printing paper PP via the paper feed motor 22, and by driving the piezoelectric elements of the print head 28 to discharge ink droplets of various colors and form ink dots.

Figure 6:
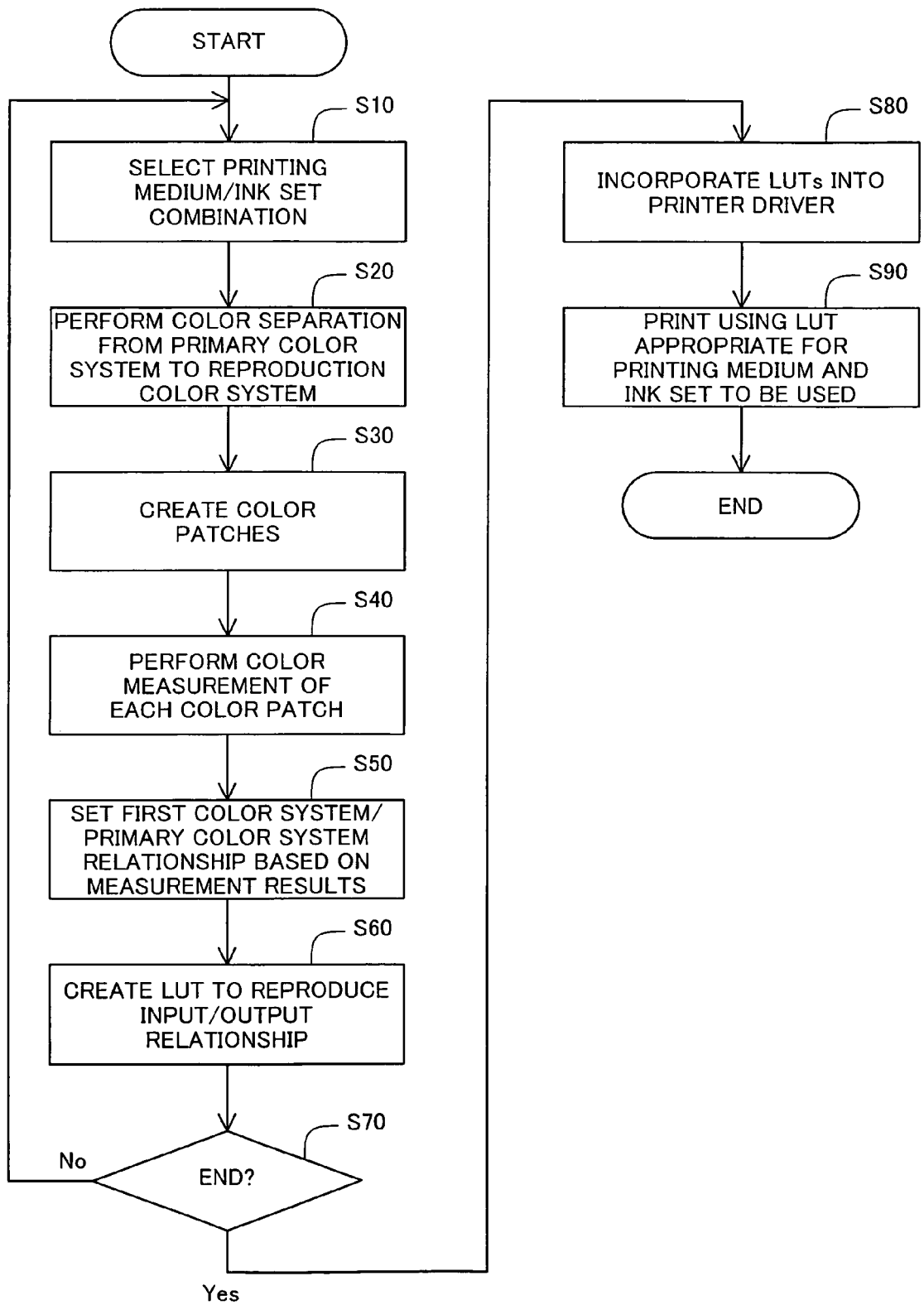
FIG. 6 is a flow chart showing a color reproduction processing routine.

B. First Embodiment of Color Separation Process:

B1. Color Conversion Lookup Table Creation Method:

FIG. 6 is a flow chart showing the color reproduction process executed in this embodiment. In steps S10-S70, a color conversion lookup table LUT (see FIG. 1) used for color reproduction is created.

First, in step S10, a combination of a printing medium and an ink set to be used for printing is selected. It is assumed that in a regular printer the printing medium selected by the user from among various types of printing media (regular paper, glossy paper, matte paper or the like) is used. Depending on the type of printer, the ink set to be used may be selected from among multiple different ink sets (such as a dye-based ink set or a pigment-based ink set, for example). The reproducibility of the colors of the printed matter depends on the printing medium and the ink set. Accordingly, in this embodiment, the operations of steps S10-S60 are performed for each combination of printing medium and ink set, and a lookup table LUT suitable for each such combination is created. The types of printing media and types of ink sets that may be used by the printer 20 are ordinarily displayed on a screen (not shown) by which to enter the printing parameter values governing the printer driver 96.

In step S20, color separation processing to convert a primary color tone value set expressed in a primary color system into a second tone value set expressed in a reproduction color system is carried out. A primary color system is a color system expressed in terms of the amounts of the chromatic primary color inks C, M and Y, while a reproduction color system is a color system expressed in terms of the amount of each ink used during printing. This primary color tone value set includes ink amounts for the chromatic primary color inks of C, M and Y. The ink amounts for the chromatic primary color inks of C, M and Y are values representing a range from the minimum possible value (zero) to the maximum value (ink amount reproducing a completely solid area) in 256 levels from 0 to 255, for example. In this embodiment, a solid area is reproduced by discharging ink onto every pixel of that area. Therefore, the ink amount when a solid area is to be reproduced can be deemed 100%.

In step S20, first, a plurality of primary color tone value sets are prepared. It is preferred that the ink amounts for the chromatic primary color inks C, M and Y in these primary color tone value sets be distributed across the entire possible range (0%-100%), and it is particularly preferred that the ink amounts be distributed evenly throughout the entire range. For the values for these ink amounts, the 11 values of 0, 25, 50, 75, 100, 125, 150, 175, 200, 225 and 255 may be used, for example. Apparent change in reproduction color versus the change in tone values of ink amounts may differ depending on ink tone value in some instances. In this case, it is preferred that ink amounts be made available for each ink color at smaller increments for tone ranges in which the apparant change in color is more noticeable. This enables a color conversion lookup table LUT to be created that more precisely prevents perceptible changes in color.

Next, these primary color tone value sets are converted into second tone value sets expressed in the reproduction color system. The reproduction color system is a color system expressed in terms of ink amounts for each ink in the ink set used during printing, i.e., the chromatic primary color inks C, M and Y and the spot color inks R and V, for example. The second tone value set includes values expressed within a system wherein the range from the minimum possible value (zero) to the maximum possible value (the ink amount when a solid area is to be reproduced) is expressed using the 256 gradations from 0-255, for example. Color separation processing [to enable conversion] from the primary color system to the reproduction color system will be described in detail below.

Figure 7:
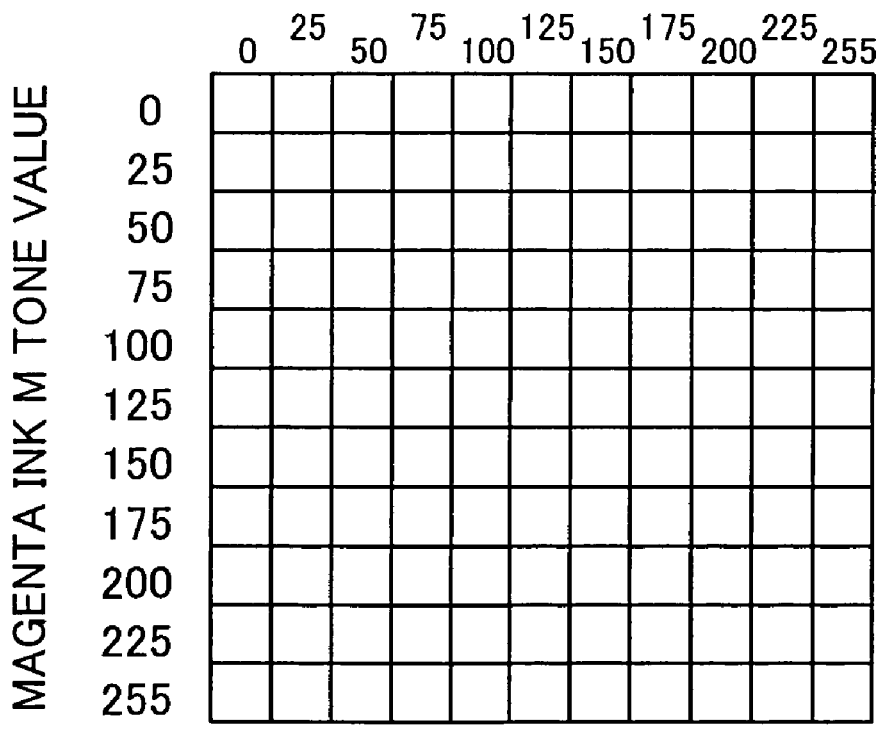
FIG. 7 is an explanatory drawing showing color patches.

In step S30, multiple color patches corresponding to the multiple chromatic primary color tone value sets are created. FIG. 7 is an explanatory drawing showing an example of color patches created in this embodiment. The vertical axis represents the tone value of the magenta ink M in the primary color tone value set prepared in step S20 above, while the horizontal axis represents the tone value of the yellow ink Y. Each color patch is reproduced using the ink amount for each ink in the ink set that is obtained by converting each tone value via the color separation process of step S20. FIG. 7 shows color patches when the tone value of cyan ink C in the primary color tone value set is set at zero. In actuality, multiple color patches corresponding to multiple cyan ink C tone values are created but are not shown in the drawing. In step S30, multiple color patches corresponding to the multiple primary color tone value sets prepared in step S20 are created as described above.

In step S40 (FIG. 6), the color patches created in step S30 undergo color measurement with a colorimeter. The data obtained from this color measurement are expressed in a color system independent from any device such as a printer or monitor, e.g., the L*a*b* color system or the XYZ color system. In step S40, a "primary-color/device-independent color system relationship" can be established for the primary color system and the device-independent color system based on colorimetric measurement for the color patches. In addition, the range of colors in the device-independent color system that can be reproduced by the printer 20 can be determined based on the results of calorimetric measurement.

In step S50, the relationship between a first color system and the primary color system is established based on the "primary-color/device-independent color system relationship" obtained in step S40 above. A first color system is a color system used for the color image data input in the color conversion lookup table LUT, such as the sRGB color system, for example. The "first color system/device-independent color system relationship" between a first color system and a device-independent color system is predetermined. Therefore, the relationship between a first color system and the primary color system can be deduced using this "first color system/device-independent color system relationship" and the "primary color/device-independent color system relationship" obtained in step S40. There may be areas of non-overlap between the reproducible color range using the first color system and the reproducible color range of the printer. In this case, it is preferred that the entirety of each color range be effectively utilized by expanding or reducing the relationship between the color systems.

When the first relationship between the first color system and the primary color system (step S50) and the second relationship between the primary color system and the reproduction color system (step S20) are established, a color conversion lookup table LUT (FIG. 1) used for reproducing such relationships is created in step S60. The color conversion lookup table LUT of this embodiment is based on input of RGB image data and output of multiple-tone image data for the six ink colors shown in FIG. 4. Accordingly, when the color conversion lookup table LUT is created, first, a primary color tone value set expressed in CMY for tone values of RGB image data is calculated. Next, a second tone value set, i.e., the amount of ink for each ink color, corresponding to this primary color tone value set is determined based on the color separation processing described below. The relationship between input RGB image data values and output ink amounts for each ink color is then stored in the lookup table LUT.

In step S70 shown in FIG. 6, it is determined whether the processing of steps S10-S60 is completed for all possible combinations of printing media and ink sets that may be used by the printer 20. If processing for all combinations is not completed, the operations of steps S10-S60 are repeated, and when processing is completed for all combinations, the next step S80 is executed.

In step S80, the multiple created color conversion lookup tables LUT are incorporated into the printer driver 96 (FIG. 1). The printer driver 96 is a computer program that executes on the computer 90 the function of creating the print data PD to be supplied to the printer 20. The color conversion lookup tables LUT are installed in the printer driver 96 as reference data therefor as well as on the computer 90. In addition, the printer driver 96 in which the color conversion lookup tables LUT are incorporated is normally supplied by the manufacturer of the printer 20.

In step S90 in FIG. 6, the user executes printing via the printer 20. At the time of printing, a lookup table appropriate for the printing medium/ink set combination used for actual printing is selected from among the color conversion lookup tables LUT for all printing medium/ink set combinations, whereupon printing is executed. The printing medium/ink set combination actually used for printing is selected by the user from a window (not shown) used to enter the printing parameter values governing the printer driver 96.

Figure 8:
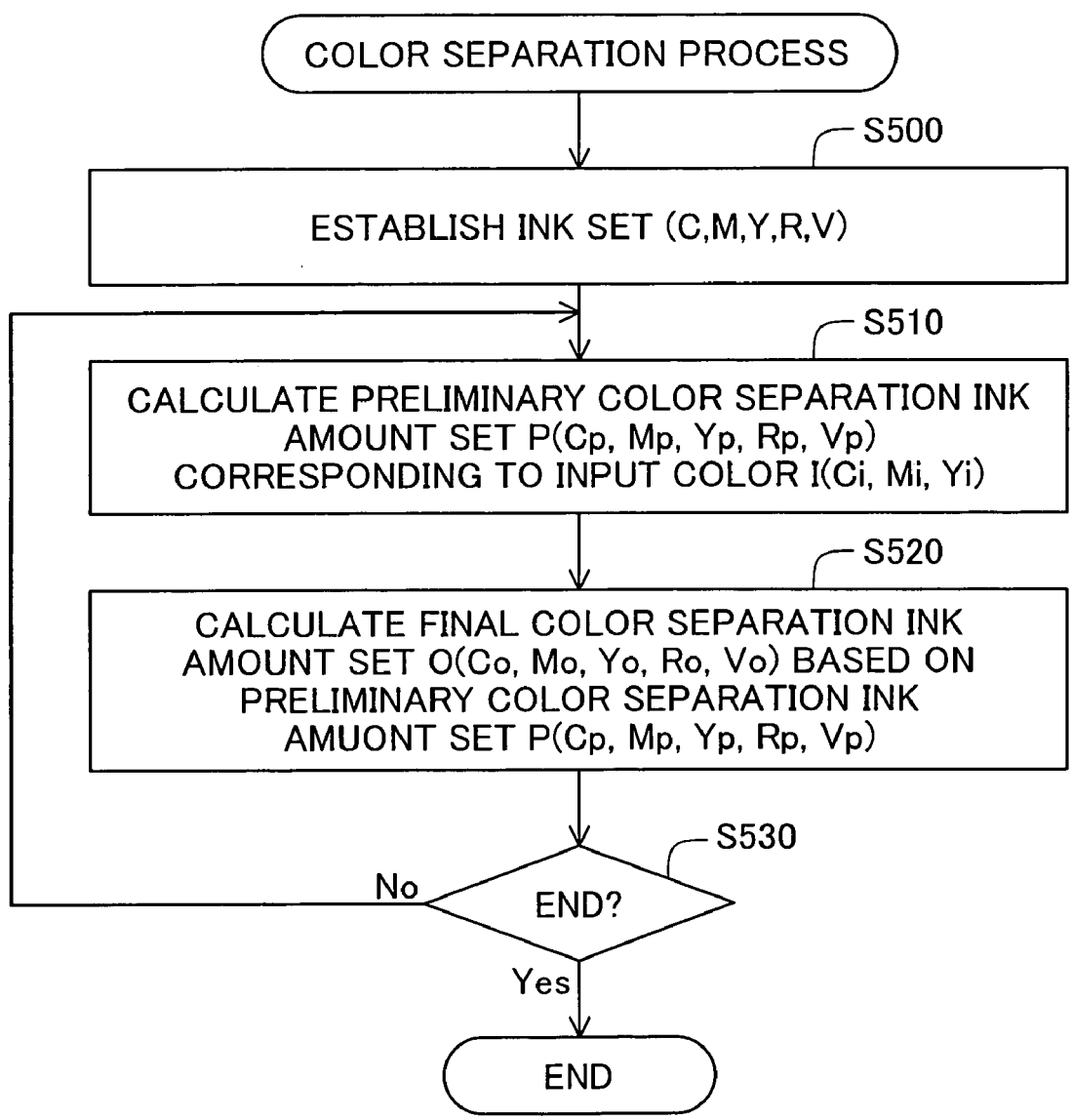
FIG. 8 is a flow chart showing a color separation processing routine.

B2. Detailed Description of Color Separation Process in First Embodiment:

FIG. 8 is a flow chart showing the sequence of operations of the color separation processing routine. This color separation process executes conversion from the primary color system to the reproduction color system. In step S500 shown in FIG. 8, an ink set including the chromatic primary colors of C, M and Y and the spot colors of R and V is specified as the ink colors to be used.

In step S510, a preliminary color separation ink amount set I(Cp, Mp, Yp, Rp, Vp) used for reproduction onto a printing medium of a reproduction color corresponding to the input color I(Ci, Mi, Yi) is calculated. In the first embodiment, it is assumed that input color I(Ci, Mi, Yi) matches a reproduction color to be reproduced. Because an unlimited number of color separation ink amount sets by which to obtain a given reproduction color exist, a preliminary color separation ink amount set is determined by imposing specific conditions. For example, in this embodiment, a preliminary color separation ink amount set P(Cp, Mp, Yp, Rp, Vp) is determined in order to minimize the total ink amount.

As described in connection with FIGS. 5(a)-5(c), a spot color ink may be separated into two chromatic primary color ink components. Therefore, the total ink amount decreases as more spot color ink is used. Furthermore, because the preliminary color separation ink amount set P of this embodiment constitutes the one color separation ink amount set that minimizes the total ink amount among all color separation ink amount sets capable of reproducing the reproduction color identical to the input color I, it is unique. However, as can be understood from the other embodiments described below, the preliminary color separation ink amount set P can be determined based on one or more other conditions.

In step S520, the final color separation ink amount set O(Co, Mo, Yo, Ro, Vo) is determined based on the preliminary color separation ink amount set P(Cp, Mp, Yp, Rp, Vp), the procedure of which will be described later in detail. In step S530, it is determined whether or not the operations of steps S510 and S520 have been completed for all reproduction colors deemed necessary in order to create a lookup table. The operations of steps S510 and S520 are repeated until processing is completed for all reproduction colors.

Figure 9:
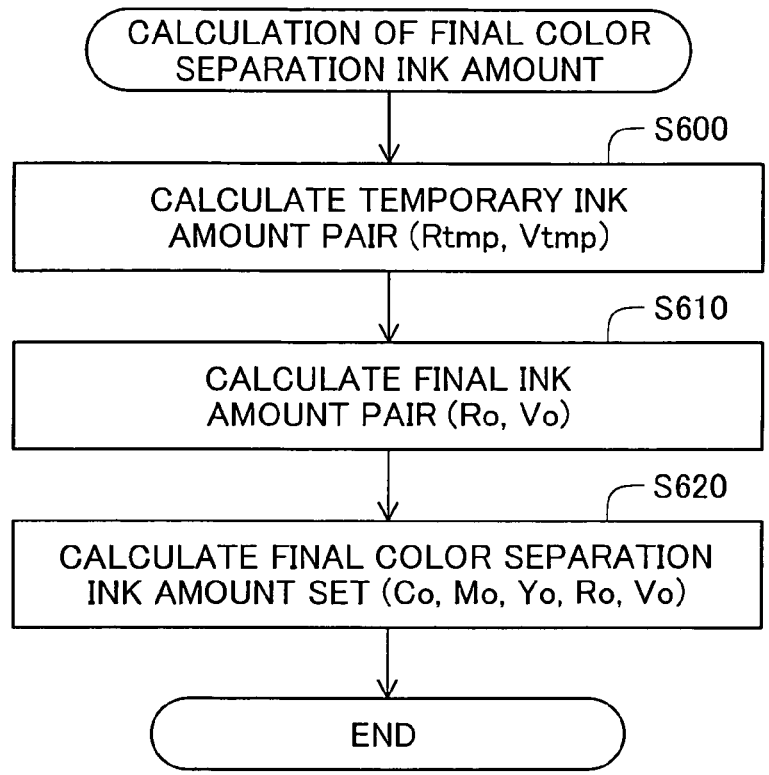
FIG. 9 is a flow chart showing a final color separation ink amount set calculation routine.

FIG. 9 is a flow chart showing the detailed sequence of operations for step S520. In step S600, temporary ink amounts Rtmp and Vtmp for the two spot color inks R and V are determined from the preliminary color separation ink amount set P.

When step S600 is executed, first, the maximum ink amounts Rmax and Vmax for the spot color inks R and V and the saturation SR are calculated. The temporary ink amounts Rtmp and Vtmp are then determined based on these values.

Figure 10:
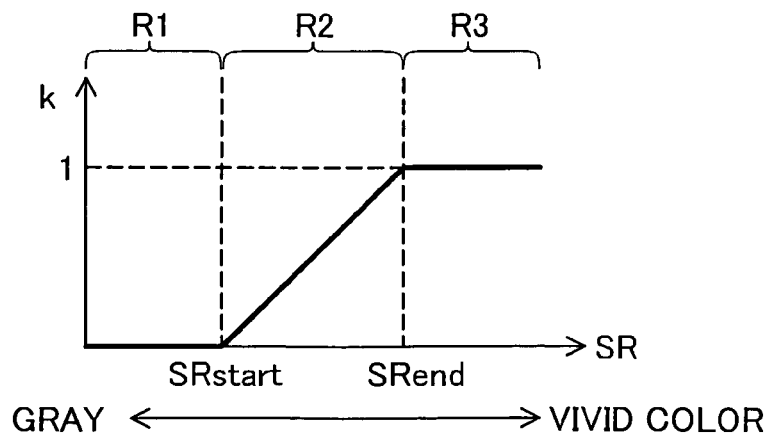
FIG. 10 is an explanatory drawing showing the relationship between the ratio of the temporary ink amount and the saturation.

FIG. 10 is a graph showing the relationship between the ratio k of the temporary ink amount Rtmp to the maximum ink amount Rmax for red ink R and the saturation SR.

The maximum ink amount Rmax is the possible maximum value of the amount of red ink R when each ink amount in the preliminary color separation ink amount set P is replaced with red ink R based on the substitution ink amount. In this embodiment, the maximum ink amount Rmax acts as a reference color separation ink amount used to determine the temporary ink amount Rtmp.

The saturation SR is a value that represents the difference between the largest tone value, i.e., max (Ci, Mi or Yi), and the smallest tone value, i.e., min (Ci, Mi or Yi) among the color components Ci, Mi, Yi for an input color I. As the input color I approaches achromaticity, the difference between the largest and the smallest among the color components Ci, Mi and Yi become smaller. Therefore, as the input color I approaches achromaticity, the saturation SR decreases in value, and when the input color I is completely achromatic, the saturation SR becomes zero. In this embodiment, because the reproduction color matches the input color I, the saturation SR may be thought of as a saturation parameter value that is related to a saturation value of the reproduction color.

In the graph of FIG. 10, the ratio k is set to zero (Rtmp=0) in a first range R1 in which the saturation SR moves from zero to a first value SRstart. The ratio k increases from zero linearly in a second range R2 in which the saturation SR moves from the first value SRstart to a second value SRend. However, in this second range R2, the ratio k does not exceed 1. In other words, the temporary ink amount Rtmp is maintained at a value smaller than the maximum ink amount Rmax. The ratio k is set to 1 (Rtmp=Rmax) in a third range in which the saturation SR equals or exceeds the second value SRend.

The ratio k, i.e., the temporary ink amount Rtmp, is set as shown in FIG. 10 for the reason described below. In order to enable reproduction of more vivid image areas, the use of ink having a higher saturation is preferred, and it is particularly preferred that the saturation of image areas be increased when the saturation parameter value is in a particularly high saturation range by using as much high-saturation ink as possible. Incidentally, the spot color inks R and V have a higher saturation than the chromatic primary color inks. Accordingly, within the third range R3 for high saturation SR shown in FIG. 10, the ratio k=1, i.e., the spot color ink maximum ink amount Rmax is used as the temporary ink amount Rtmp as is. If this is done, a higher saturation can be reproduced. Furthermore, by using a large amount of spot color ink (limited by the usable range) when the saturation parameter value is in the high-saturation range, color reproduction for image areas having a hue close to the hue of the spot color ink can be improved.

When the saturation parameter value is in a low-saturation range, on the other hand, because the image area sought to be reproduced is close to achromatic, there is little need to use high-saturation ink. Accordingly, In the first range R1 in FIG. 10 for low saturation SR, the ratio k=0, i.e., the temporary ink amount Rtmp is set to zero. This enables the use of spot color inks to be conserved. In the second range R2, the ratio k is increased linearly so that the temporary ink amount Rtmp will not change in a jerky, stair-step fashion across the three ranges R1-R3, but will rather change in a relatively smooth, gradual fashion. By setting the ratio k, that is, the temporary ink amount Rtmp, in accordance with the degree of saturation SR in this manner, amounts of the chromatic primary color inks and spot color inks can be determined appropriately taking into account the differences in the color reproducibility characteristics of the inks. Furthermore, it is acceptable if the change in the ratio k traces a curved line rather than a straight line. In this case, by setting the relationship between the ratio k and the saturation SR in the second and third ranges R2 and R3 such that it is expressed as a curve that is rounded at the top, an increase rate of the ratio k can be set to decline as the saturation SR increases. As a result, changes in the ink amount of each color component in the high-saturation range can be made less noticeable.

For violet ink V as well, the ratio k, i.e., the temporary ink amount Vtmp, is determined from the saturation SR based on the same method used with red ink R.

In step S610 in FIG. 9, the final color separation ink amount pair Ro, Vo is determined from the temporary ink amount pair Rtmp, Vtmp. This final color separation ink amount pair Ro, Vo is determined by modifying the temporary ink amount pair Rtmp, Vtmp as necessary to ensure compliance with any applicable ink duty limits. Here, an ink duty limit is a restriction on the amount of ink that can be used per unit area of printing medium. An ink duty limit may be placed on each individual ink color, on the total amount of ink used by a combination of two ink colors, or on the total amount of ink used.

When step S610 is executed, first, the temporary ink amount pair Rtmp, Vtmp and the temporary ink amounts for the chromatic primary color inks C, M and Y deemed necessary to reproduce the desired reproduction color are calculated. It is then determined whether or not these temporary ink amounts satisfy the applicable ink duty limits.

Figure 11A:
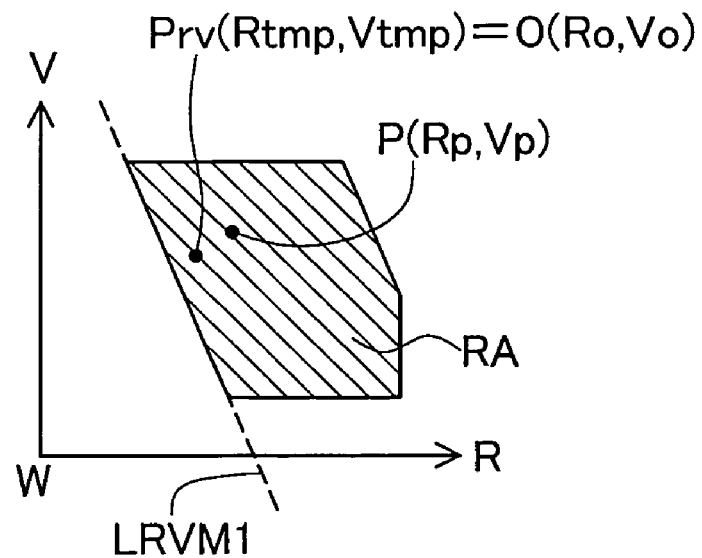
FIGS. 11(a) and 11(b) are explanatory drawings showing the elements of the calculation of the final color separation ink amount for a spot color ink.
Figure 11B:
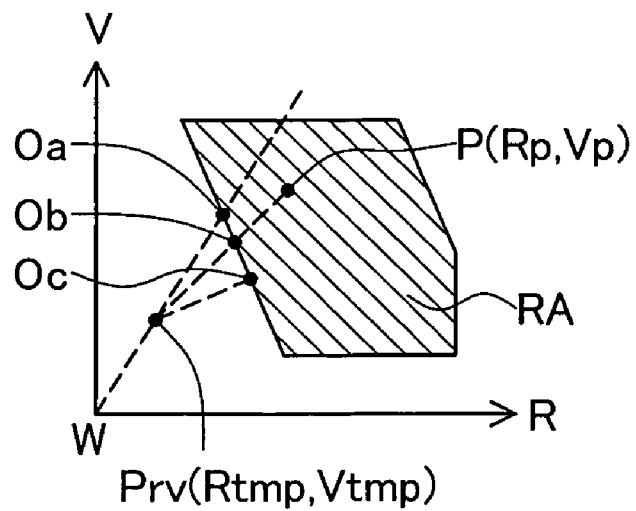

FIGS. 11(a) and 11(b) show an example of the permissible range RA under ink duty limits drawn in a two-dimensional color space represented by spot color inks R and V. In these drawings, examples of a preliminary color separation ink amount pair coordinate point P(Rp, Vp) and a temporary ink amount pair coordinate point Prv(Rtmp, Vtmp) are also shown. The boundary lines of the permissible range RA constitute not only the boundary lines defined by the ink duty limits governing each spot color ink, but also boundary lines defined by other ink duty limits. For example, the boundary line LRVM1 at the lower left part of the permissible range RA corresponds to the ink duty limit governing magenta ink. As described in connection with FIGS. 5(a)-5(c), because the two spot color inks R and V both include a magenta component, when the ink amounts for the spot color inks R and V decrease, the magenta ink M ink amount increases. Accordingly, in order to satisfy the ink duty limit for magenta ink M, it is necessary that the ink amounts for the spot color inks R and V be located to the upper right of the boundary line LRVM1. As can be understood from this explanation, the question of whether an ink duty limit is satisfied is determined taking into consideration the ink amounts for all inks in the ink set. However, for ease of explanation during the discussion below, it is assumed that all ink duty limits are satisfied when the temporary ink amount pair Rtmp, Vtmp falls within the permissible range RA.

Where the color coordinate point Prv for a temporary ink amount pair falls within the permissible range RA as shown in FIG. 11(a), the temporary ink amount pair Rtmp, Vtmp is used as the final color separation ink amount pair Ro, Vo as is. On the other hand, where the color coordinate point Prv for a temporary ink amount pair falls outside the permissible range RA as shown in FIG. 11(b), the final color separation ink amount pair Ro, Vo is determined by modifying the temporary ink amount pair Rtmp, Vtmp to ensure that the applicable ink duty limits are satisfied. When this is done, a point that resides within the permissible range RA in the two-dimensional color space and is near the temporary ink amount pair color coordinate point Prv is selected as the color coordinate point for the final color separation ink amount pair Ro, Vo. In the example of FIG. 11(b), three points Oa, Ob and Oc that are eligible for selection as the final color separation ink amount pair coordinate point are drawn. The first point Oa(Ro, Vo) is a point at which the ratio Ro/Vo of the final color separation ink amount pair equals the ratio Rtmp/Vtmp of the temporary ink amount pair. The second point Ob is the point at which the straight line connecting the preliminary color separation ink amount pair color coordinate point P(Rp, Vp) with the temporary ink amount pair color coordinate point Prv intersects a boundary line of the permissible range RA. The third point Oc is the point within the permissible range RA that is closest to the temporary ink amount pair color coordinate point Prv.

Any of these three points Oa, Ob or Oc can be selected as the final color separation ink amount pair color coordinate point, but it is preferred that the first point Oa be selected. The reason for this is as follow. The temporary ink amounts pair Rtmp, Vtmp are determined based on the relationship shown in FIG. 10 as the preferred ink amounts when apportioning ink usage between the chromatic primary color inks and the spot color inks in consideration of the differences in the color reproducibility characteristics between the inks. Therefore, if this ratio Rtmp/Vtmp is maintained, an imbalance in the use of one of the two spot color inks can be prevented.

Because an ink duty limit functions as a limitation only when a large amount of ink is used to form an image, it becomes an issue mainly regarding image areas having a low level of brightness (or image areas having a high density). Therefore, an ink duty limit is not an issue for image areas having a relatively high brightness, and the temporary ink amounts Rtmp, Vtmp set using the relationship shown in FIG. 10 can be used as the final color separation ink amounts Ro, Vo as is. Consequently, the ink amounts for the spot color inks R and V are small in image areas that have a low density and are close to achromatic. In image areas that are close to achromatic in particular (i.e., where the saturation SR falls within the first range R1), the ink amounts for the spot color inks become zero. Such ink amounts (Ro=Vo=0) are set for reproduction colors having a saturation SR that falls within the first range R1 regardless of hue. In image areas having a high saturation, the ink amounts for the spot color inks are set to large values within the usable range. As a result, more vivid image areas can be reproduced and the chromatic primary color inks and spot color inks can be used more efficiently.

The spot color inks R and V have a higher saturation than the chromatic primary color inks. Therefore, by using spot color inks rather than chromatic primary color inks, the total ink amount can be reduced. As a result, in low-brightness image areas, even where the total usable ink amount is limited by an ink duty limit, more richly colored image areas can be reproduced by using the spot color inks R and V.

In step S620 shown in FIG. 9, the other ink amounts Co, Mo, Yo necessary to reproduce the reproduction color in combination with the final color separation ink amount pair Ro, Vo obtained in the manner described above are determined. As a result, a color separation ink amount set (Co, Mo, Yo, Ro, Vo) to reproduce a desired reproduction color is determined.

In the first embodiment, as described above, for both of the spot color inks R and V, the ratio k of the temporary ink amount Rtmp or Vtmp to the maximum possible ink amount Rmax or Vmax is set such that it decreases as the saturation parameter value SR decreases (see FIG. 10). Therefore, when the saturation parameter value is in a low-saturation range, the final spot color ink color separation ink amounts Ro and Vo are set to decrease as the separation parameter value SR decreases. In general, when the saturation parameter value falls within a prescribed range that is close to achromaticity, it is preferred that the spot color ink amounts be adjusted such that they decrease as the saturation parameter value changes in the direction of lower saturation. This enables more vivid image areas to be reproduced using spot color inks, while the use thereof is conserved. In particular, because the temporary ink amounts Rtmp, Vtmp are set to zero in the first range R1 in which the saturation SR is relatively low (see FIG. 10), the final color separation ink amounts Ro, Vo are also set to zero in image areas whose color is close to achromaticity, enabling significant conservation in the use of spot color inks. However, the temporary ink amounts Rtmp, Vtmp may also be set to relatively small non-zero values in the first range R1.

In this embodiment, within the range in which the saturation parameter value SR is smaller than the second value SRend, the temporary ink amounts Rtmp, Vtmp are set to values smaller than the maximum ink amounts Rmax, Vmax (see FIG. 10). In other words, the final color separation ink amounts Ro, Vo are set to values smaller than the maximum ink amounts Rmax, Vmax. Therefore, it can be understood that the maximum ink amounts Rmax, Vmax set based on substitution ink amount in this embodiment correspond to the hypothetical ink amounts of the present invention. In general, it is preferred that the spot color ink amounts be adjusted such that they are smaller than the hypothetical ink amounts for the spot color inks used to reproduce a reproduction color, which are determined based on prescribed ink amount conditions. This enables the spot color ink amounts to be easily adjusted.

Furthermore, in this embodiment, the ratio k of the temporary ink amounts Rtmp, Vtmp to the maximum ink amounts Rmax, Vmax decreases monotonously as the saturation parameter SR moves in the direction of achromaticity (see FIG. 10). In general, it is preferred that when the saturation parameter value falls within a prescribed range close to achromaticity, the ratio of the spot color ink amounts to the hypothetical ink amounts be adjusted such that it decreases monotonously as the saturation parameter value moves in the direction of achromaticity. This enables the spot color ink amounts to be reduced appropriately within the low-saturation range.

Moreover, in this embodiment, the maximum ink value Rmax is the maximum value when ink duty limits are not taken into account. Therefore, the actual maximum value for the final color separation ink amount for red ink R may be smaller than the maximum ink amount Rmax. Alternatively, a maximum value taking ink duty limits into account may be used instead. In either case, by setting the ink amount maximum value based on the reproduction color as the maximum ink amount Rmax, the temporary ink amount Rtmp can be easily set. In addition, the first value SRstart and the second value SRend used to determine the level of saturation SR (see FIG. 10) may be different values for each ink color. In this way, color separation processing that appropriately uses the various individual inks while taking into account the differences in their color reproducibility characteristics can be performed.

Furthermore, in an image area having a hue that does not use either of the spot color inks whatsoever, the processing to adjust the spot color ink amounts need not have the features described above, and the spot color ink amounts are set to zero regardless of saturation.

Figure 12:
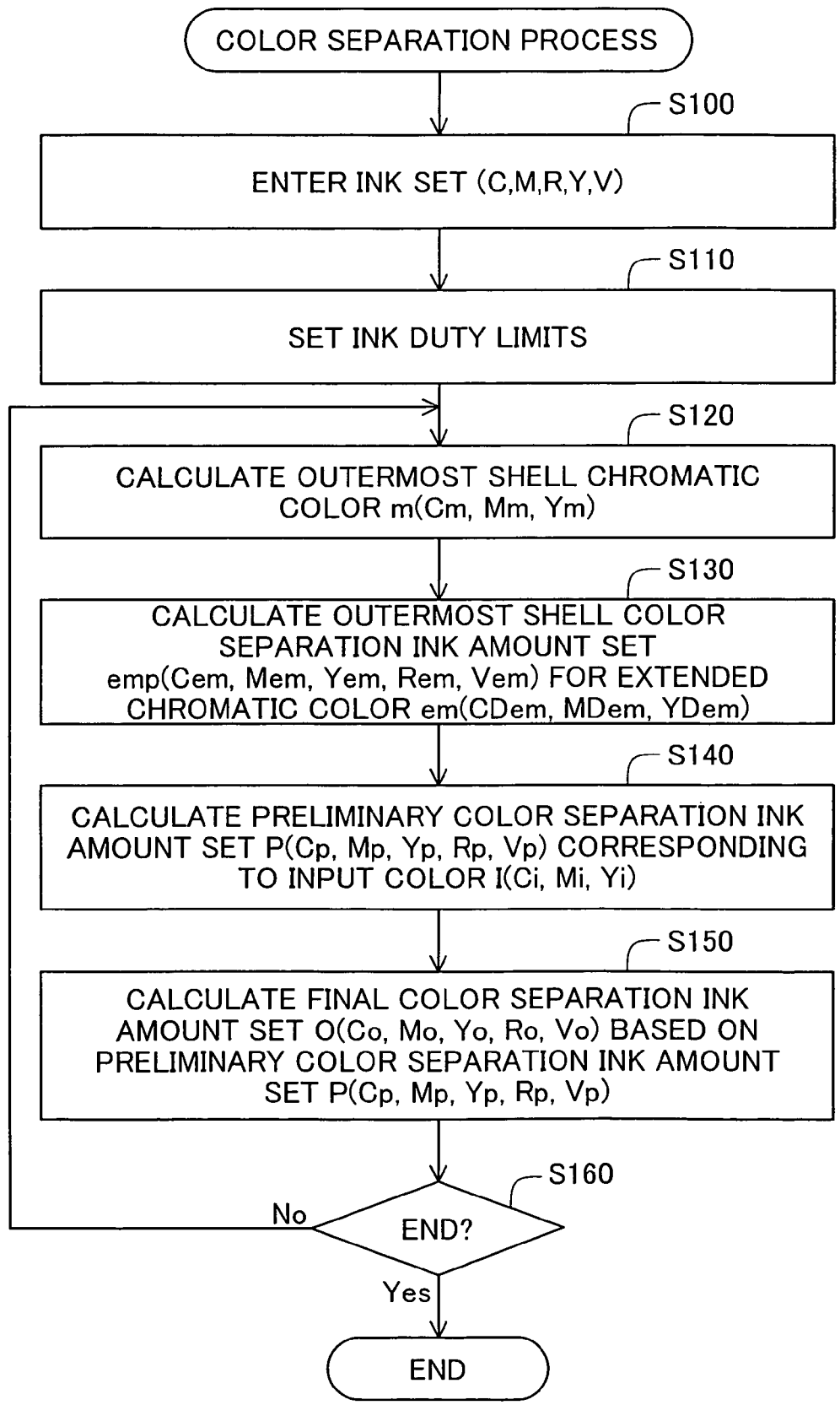
FIG. 12 is a flow chart showing a color separation processing routine.

C. Second Embodiment of Color Separation Process:

FIG. 12 is a flow chart showing the sequence of operations executed in a second embodiment. In the first embodiment described above, the input colors of the primary color system were used as the reproduction colors (the colors of the reproduction color system) as is, but in the second embodiment, colors having a higher saturation than the input colors are assigned as reproduction colors. This is possible because the spot color inks R and V included in the reproduction-color color space can achieve a higher saturation for red and violet than color mixtures based on the chromatic primary color inks.

In step S100 in FIG. 12, an ink set comprising the chromatic primary color inks C, M, Y and the spot color inks R, V is selected as the available ink set.

Next, in step S110, ink duty limits constituting restrictions on the amount of ink of each color in the ink set are established. These ink duty limits (described in more detail below) are set in accordance with the inks and the printing medium.

The input colors represented in the primary color system are expressed using tone values (or a primary color tone value set) wherein the range of possible ink amounts for each of the CMY inks (0-100%) is expressed using the 256 tone values from 0-255. The color separation ink amounts represented in the reproduction color system are expressed using tone values wherein the range of possible ink amounts for each of the CMYRV inks (0-100%) is expressed using the 256 tone values from 0-255.

Figure 13A:
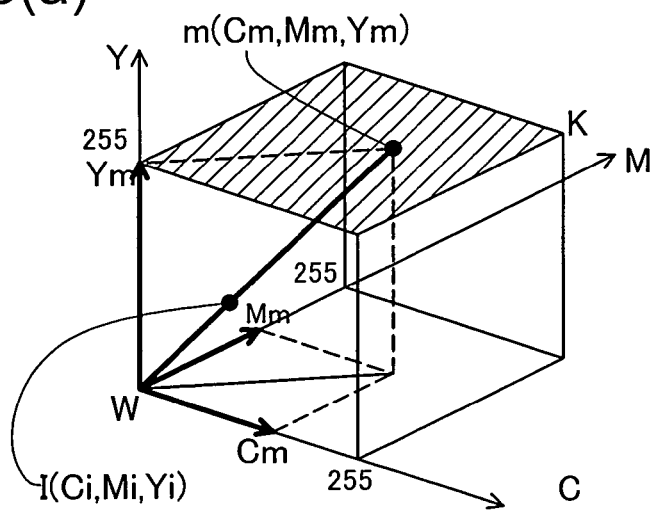
FIGS. 13(a)-13(c) are explanatory drawings of a chromatic primary color space.
Figure 13B:
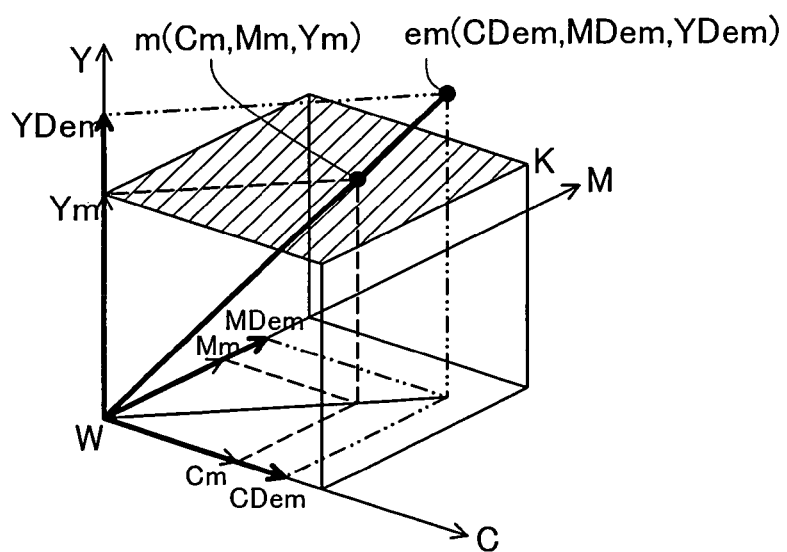

FIGS. 13(a) and 13(b) are explanatory drawings showing a primary color space in which CMY ink amounts are indicated as base vectors. A color expressed in the primary color system is shown as one point in a cubic space comprising CMY tone values in the primary color space. This cubic space is an area in which the ink amount value for each chromatic primary color ink CMY can exist. In the discussion below, this cubic space is termed a color cube, and the three surfaces out of the six total surfaces of the color cube that face the origin (the three surfaces that surround point K at which C=M=Y=100%) are termed type 1 outer shell planes. In other words, each type 1 outer shell plane is composed of color points at which at least one of the chromatic primary color ink amounts is 100%, and at least one of the chromatic primary color ink amounts has a value of less than 100%. When the straight line that connects the origin W and the point K is termed the line of achromaticity, the distance between any particular point in the primary color space and the line of achromaticity can be used as a saturation index of the particular point. When the point obtained by vertically projecting the particular point in the primary color space onto the line of achromaticity is termed a projection point, the distance between the origin W and the projection point can be used as a lightness index of the particular point. The direction from the projection point to the particular point in the primary color space can be used as a hue index of the particular point.

In FIGS. 13(a) and 13(b), the type 1 outer shell plane on which Y has the maximum value (Y=255) is marked by hatched lines. One color m is indicated thereon. This color m is set as an outermost shell chromatic color m in step S120 in FIG. 12. In the example shown in FIGS. 13(a) and 13(b), the outermost shell chromatic color m is set to reside on the outer shell plane in which the Y color component is at the maximum value, and the tone values for these CMY colors are Cm, Mm and Ym (in this example, Ym=255).

In the color separation process of this embodiment, the color separation ink amount set (in this embodiment, the tone values of each CMYRV color) is obtained for an input color I existing on the line connecting the origin W and the outermost shell chromatic color m by executing the operations of steps S130-S150 described below in sequence. In this embodiment, in order to execute color separation processing regarding multiple input colors I, multiple outermost shell chromatic colors are prepared and the series of operations (S130-S150) is executed for each outermost shell chromatic color.

In step S130 in FIG. 12, an extended chromatic color em positioned on an outer boundary of the color area that can be reproduced using the CMYRV ink colors of the ink set is sought (see FIG. 13(b)).

Figure 14A:
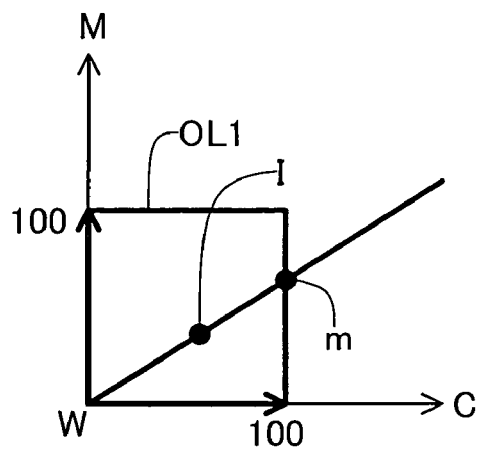
FIGS. 14(a) and 14(b) are explanatory drawings showing the elements of the calculation of an extended chromatic color.
Figure 14B:
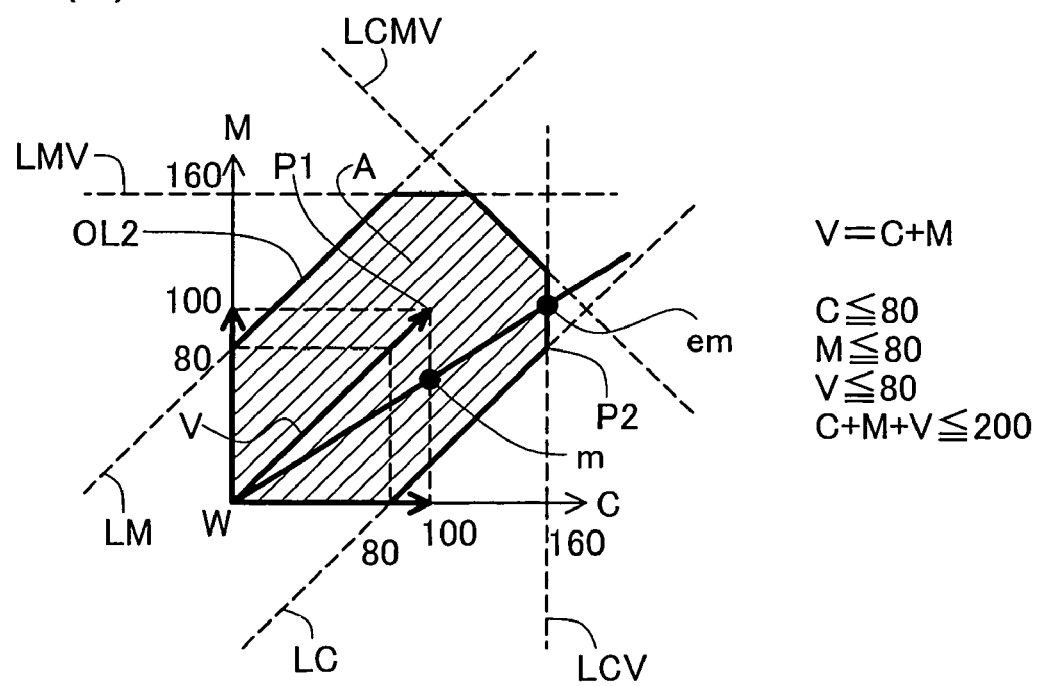

FIGS. 14(a) and 14(b) illustrate the calculation of the extended chromatic color em. In the example of FIGS. 14(a) and 14(b), in order to simplify the description, cyan ink C and magenta ink M are deemed usable chromatic primary color inks, while violet ink V is deemed a usable spot color ink.

FIG. 14(a) is an explanatory drawing showing the primary color space. In this example, the tone value of each of the CMV colors is expressed within the range of 0-100. Therefore, an input color based on the primary color system is shown as a point within a square having a side length of 100. This square is equivalent to the cube described above. Furthermore, in the drawing, the type 1 outer shell lines OL1 of the square are drawn in thick lines. These type 1 outer shell lines OL1 are equivalent to the type 1 outer shell planes described above. An outermost shell chromatic color m is placed on one of the type 1 outer shell lines OL1 on which the C value is at the maximum value (C=100).

FIG. 14(b) depicts the range of possible values for hypothetical ink quantities for each color, when colors reproducible using a spot color ink V in addition to chromatic primary color inks C, M are expressed in a primary color system. Here, it is assumed that a 1:1 mixture of cyan ink C and magenta ink M can reproduce substantially identical hue and saturation as an violet ink V in an equal amount. In other words, the violet ink V substitution ink amount is 1 for both cyan ink C and magenta ink M. For example, the color P1 in FIG. 14(b) can be reproduced when the tone values of C and M are both 100. The substantially identical color can be reproduced if the tone value of each color C, M is replaced with the tone value for V. That is, the substantially identical color can be reproduced when the tone value of V only is 100. In other words, with regard to all tone values for the colors C and M, the substantially identical color can be reproduced by converting them into the tone value for V. Here, the tone values obtained by converting all of the spot color ink V tone values into chromatic primary color ink C, M tone values can be used as hypothetical tone values to represent any color reproducible in the primary color space using CMV inks.

Furthermore, in this embodiment, the restrictions described below are imposed on the tone values for each ink color.

Condition (a): The tone value for each individual ink is 80 or lower.

Condition (b): The total of the individual ink color tone values is 200 or lower.

The restrictions on tone values imposed by the conditions (a) and (b) can be described in the following manner. There is a limit to how much ink can be absorbed per unit area of printing medium. If ink is discharged in an amount that exceeds this limit, the ink that was not absorbed can cause the ink to bleed and/or cause the printing medium to warp. As a result, it is preferred that a restriction be imposed on the amount of ink used. The upper limit of this ink amount, i.e., the tone value upper limit, is called an ink duty limit. The proper value for this ink duty limit may vary depending on the type of ink. In this case, the image quality of the printed image can be improved by setting a different ink duty limit for each ink. Moreover, by setting a restriction on the total of the tone values for the various inks (that is, on the total ink amount value) like that imposed by condition (b) above, the discharge of ink in an amount exceeding the absorption limit of the printing medium can be prevented. For image areas to be reproduced using a mixture of two colors, it is preferred that a restriction value be established for the total value of the ink amounts for a given two colors of ink. It is also preferred that a restriction value be established for the total value on the ink amounts for many different types of ink. If these restriction values are changed in accordance with the type of printing medium, the image quality of the printed image can be improved in accordance with the type of printing medium.

Ink duty limits such as these are expressed in terms of tone values for each of the CMV color inks that can be used by the printer. They may also be shown in the primary color space by using hypothetical tone values for C and M color inks obtained using substitution ink amount. In the example of FIGS. 14(a) and 14(b), because ink duty limits for the CMV colors are linear, the ink duty limits are shown using straight lines in the primary color space. Therefore, the area containing colors that can be reproduced using the CMV ink colors within the ink duty limits is the area enclosed by straight lines corresponding to the various ink duty limits. In FIG. 14(b), the straight line LC represents a straight line defined by C=80. It is slanted relative to the CM axes because the maximum hypothetical tone values for C and M can be further increased by using violet ink V. Therefore, the area that satisfies the condition C≦80 is inside the straight line LC. The straight line LCV is a straight line defined by the condition of (C+V≦160). This straight line corresponds to the limit of (C+V≦160) which derives from the two conditions (C≦80) and (V≦80). The area that satisfies this condition (C+V≦160) is inside this straight line LCV.

The intersection point P2 between the straight lines LC and LCV has a C tone value of 160 and an M tone value of 80. Because the C tone value of this color P2 does not satisfy one of the ink duty limits (condition (a)), it cannot be reproduced using only the two colors of C and M. Suppose that the 80 of the CM tone values is replaced by a V tone value. When this is done, the tone values for the three CMV colors, i.e., the color separation ink amounts, become 80, 0 and 80 in CMV order, thereby satisfying the relevant ink duty limit. In other words, the color P2 can be reproduced by using the chromatic primary color inks C, M and the spot color ink V.

In FIG. 14(b), the following straight lines corresponding to ink duty limits are also shown. The straight line LCMV represents (C+M+V=200), the straight line LMV represents (M+V=160), and the straight line LM represents (M=80). As a result, the colors inside the area A enclosed by these straight lines are colors that satisfy all of the ink duty limits, and can be reproduced using the spot color ink V. In other words, if the hypothetical tone values of a color obtained by replacing the spot color ink tone value with the chromatic primary color ink tone values fall within the area A, that color can be reproduced using the chromatic primary color inks and spot color ink.

The distances between the origin W and these straight lines LC, LCV, LCMV, LMV and LM depend on the substitution ink amount. More specifically, the distance between the straight line corresponding to each ink duty limit and the origin W increases as the substitution ink amount increases. As a result, as the substitution ink amount increases, the range of colors that can be reproduced by using chromatic primary color inks and spot color inks increases. Therefore, from the standpoint of increasing the color-reproducible area, it is preferred that a total amount of the substitution ink amounts equal or exceed 1, and it is particularly preferred that such total value equal or exceed 1.5. In the example of FIGS. 14(a) and 14(b), because the violet ink V substitution ink amount is 1 for both C ink and M ink, the total substitution ink amount is 2. In the example of the ink set shown in FIGS. 5(a)-5(c), the red ink R substitution ink amount are 0.0, 0.71 and 2.86 for CMY, respectively, and the total substitution ink amount is 3.57. The violet ink V substitution ink amount are 0.68, 2.87 and 0.00 for CMY, respectively, and the total substitution ink amount is 3.57. Because the total substitution ink amount values for the inks R and V both exceed 1.5, a wider reproducible range can be achieved by using the inks R and V. Moreover, where the total value of each chromatic primary color ink substitution ink amount is greater than 1, a higher saturation can be reproduced by using amounts of spot color inks comparable to the amounts in mixtures of chromatic primary color inks. In this way, a wider saturation range can be reproduced by using chromatic primary color inks and spot color inks than can be reproduced using only chromatic primary color inks.

In this Specification, the outer boundaries of the area that satisfies ink duty limits are termed "reproduction color outer shell planes". Reproduction color outer shell planes are represented in the reproduction color system that is used to indicate the amount of each ink of the ink set, but by replacing each spot color ink amount with chromatic primary color ink amounts based on the substitution ink amounts, the outer boundaries can be mapped onto the primary color system. In the example of FIG. 14(b), the outer shell line OL2 constituting the outer shell of the area A corresponds to a reproduction color outer shell plane mapped onto the primary color system (the outer shell line OL2 are termed the "reproduction color outer shell lines OL2" below). Because the condition (V≦80) is met if a color falls within the area A, the straight line for this condition is omitted from the drawing.

In FIG. 14(b), the area A is marked with hatched lines, and the reproduction color outer shell lines OL2 are drawn in a thick line. An extended chromatic color em exists on one of the reproduction color outer shell lines OL2. This extended chromatic color em is a color positioned at the intersection point between the reproduction color outer shell line OL2 and the line segment that passes through the origin W and the outermost shell chromatic color m. In other words, the extended chromatic color em is a color indicated by the longest extended color vector having the same direction as the outermost shell chromatic color vector of the outermost shell chromatic color m in the primary color space, and is also a color as to which the outermost shell color separation ink amount set to reproduce it falls within the ink duty limits.

Such an extended chromatic color described above can also be set in the same fashion where the number of ink colors is increased. In FIG. 13(b), the extended chromatic color em is shown in the primary color space for the CMY ink amounts. The extended chromatic color em is a color obtained by using the chromatic primary color inks C, M and Y and the spot color inks R and V.

The hypothetical tone values used to express the extended chromatic color em in the primary color space are deemed CDem, MDem and YDem, and the ink amounts in the ink amount set that corresponds to the extended chromatic color em (corresponding to the outermost shell color separation ink amount set) are Cem, Mem, Yem, Rem and Vem. The hypothetical CMY tone values CDem, MDem and YDem are expressed via the mathematical expressions below using the substitution ink amounts shown in FIGS. 5(b) and 5(c).

Mathematical Expressions 1:

$$CDem = Cem + wCR \times Rem + wCV \times Vem$$

$$MDem = Mem + wMR \times Rem + wMV \times Vem$$

$$YDem = Yem + wYR \times Rem + wYV \times Vem$$

In this embodiment, the extended chromatic color em is calculated such that these outermost shell color separation ink amounts Cem, Mem, Yem, Rem and Vem satisfy the condition shown below.

(Condition 1) The CMYRV color separation ink amount set satisfies all ink duty limits.

The ink duty limits may include limits on such things as the total ink amount value for all ink colors, the ink amount for each individual ink color, or the ink amount for a mixture of two color inks.

A limit on the total ink amount value for all ink colors could be expressed using the following mathematical expression, for example. Mathematical expression 2:

$$C + M + Y + R + V \leq \text{Duty\_T}$$

In this mathematical expression, C, M, Y, R and V are the respective ink amounts for the colors CMYRV (this is true for subsequent mathematical expressions as well), and Duty_T is a preset limit value determined in accordance with the type of inks and that of printing medium.

Limits on the amount of each individual ink may be expressed using the following mathematical expressions: Mathematical expressions 3:

$$C \leq \text{Duty\_C}$$

$$M \leq \text{Duty\_M}$$

$$Y \leq \text{Duty\_Y}$$

$$R \leq \text{Duty\_R}$$

$$V \leq \text{Duty\_V}$$

Duty_C through Duty_V are preset limit values governing each ink color in accordance with the type of inks and that of printing medium.

Limits on the ink amounts of mixtures of two color inks are expressed using the following mathematical expressions, for example. Mathematical expressions 4:

$$C + M \leq \text{Duty\_CM}$$

$$C + Y \leq \text{Duty\_CY}$$

$$C + R \leq \text{Duty\_CR}$$

$$C + V \leq \text{Duty\_CV}$$

$$M + Y \leq \text{Duty\_MY}$$

$$M + R \leq \text{Duty\_MR}$$

These limits are imposed on combinations of any two ink colors, six of which such combinations are shown as examples. Duty_CM through Duty_MR are preset limit values governing ink combinations determined in accordance with the type of inks and that of printing medium.

Limits governing combinations of any desired number of ink colors, such as three-color or four-color combinations, may be imposed.

Figure 13C:
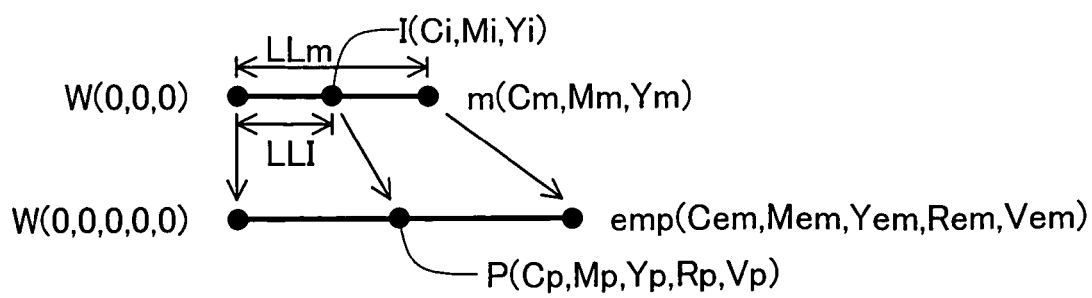

Each of he above ink duty limits, or (Condition 1), can be represented as a plane in the primary color space shown in FIGS. 13(a)-13(c) using hypothetical tone values for CMY colors obtained using substitution ink amounts, and the area enclosed by these planes satisfies the ink duty limits. Therefore, if the CMY hypothetical tone values for a particular color to be reproduced by CMYRV color ink amounts fall within the area enclosed by these planes, the ink duty limits for each ink color amount are satisfied, and therefore that particular color can be reproduced using the chromatic primary color inks C, M and Y and the spot color inks R and V. In addition, in this embodiment, part of a mixture of the chromatic primary color inks of C, M and Y can be substituted by the spot color inks R and V according to the substitution ink amounts shown in FIGS. 5(b) and 5(c), resulting in a smaller total ink amount than the aggregate of the chromatic primary color ink amounts before substitution. In other words, the spot color inks R and V can reproduce a higher saturation when used in roughly the same amounts as a mixture of the chromatic primary color inks of C, M and Y. As a result, by using the chromatic primary color inks CMY and the spot color inks RV, a wider saturation range can be reproduced than is possible using the chromatic primary color inks CMY only.

FIG. 13(b) shows an example of an extended chromatic color em. The extended chromatic color em is positioned on an outer shell plane of the area satisfying the ink duty limits (Condition 1), i.e., a reproduction color outer shell plane (not shown). The extended chromatic color em resides on a line segment that passes through the origin W and the outermost shell chromatic color m. That is, it is a color that exists at the point of intersection between the reproduction color outer shell plane and the line segment that passes through the origin W and the outermost shell chromatic color m. In other words, the extended chromatic color em is a color indicated by the longest extended chromatic color vector having the same direction as the outermost shell chromatic color vector that indicates the outermost shell chromatic color m in the primary color space, and a color separation ink amount set used to reproduce the extended chromatic color em, which is termed an outermost shell color separation ink amount set, falls within the ink duty limits.

This extended chromatic color em can be calculated using various methods. For example, it can be calculated incrementally by repeatedly executing a series of operations, i.e., selecting a color in the primary color space, substituting the chromatic primary color inks with spot color inks, calculating a color separation ink amount set, and determining whether the color separation ink amount set satisfies the ink duty limits (Condition 1). Alternatively, the extended chromatic color em can be calculated using the so-called linear programming method based on the substitution ink amounts and the various mathematical expressions of the ink duty limits (Condition 1). In this case, the series of steps of S120-S130 (FIG. 12) is performed at one time.

By calculating the extended chromatic color em as to which the outermost shell color separation ink amount set satisfies the ink duty limits (Condition 1) as described above, an extended chromatic color em that has the largest tone value and is positioned in the same direction as the outermost shell chromatic color m can be obtained within a range that ensures high image quality when that color is printed.

In step S140 of FIG. 12, the preliminary color separation ink amount set P corresponding to the input color I (see FIG. 13) is calculated. In this step S140, first, an outermost shell color separation ink amount set emp for the extended chromatic color em is calculated. The outermost shell color separation ink amount set emp are already calculated during the calculation of the extended chromatic color em in step S130 described above for the purpose of determining whether the ink duty limits (Condition 1) are satisfied. However, where there are many types of usable ink, the degree of freedom in substituting chromatic primary color inks with spot color inks increases. As a result, multiple combinations of ink amounts may be selected within a range that satisfies the ink duty limits (Condition 1) as available outermost shell color separation ink amount sets for the extended chromatic color em. When this is the case, in this embodiment, the combination having the smallest total ink amount value is selected from among the available combinations and used as the outermost shell color separation ink amount set emp.

Next, a preliminary color separation ink amount set P is calculated based on the outermost shell color separation ink amount set. FIG. 13(c) shows the relationship between the input color I and the preliminary color separation ink amount set P. In this embodiment, the preliminary color separation ink amount set P is obtained by multiplying the outermost shell color separation ink amount set emp by the ratio of LLI to LLm, where LLI denotes a length of a vector representing the input color I, and LLm denotes a length of a vector representing the outermost shell chromatic color m. According to this calculation, the outermost shell chromatic color m is mapped to the outermost shell color separation ink amount set emp. Any colors between the origin W and the outermost shell color separation ink amount set emp are reproducible using the specific combination of printing medium and ink set. Therefore, the range of colors that can be reproduced using the specific combination of printing medium and ink set are effectively utilized. Furthermore, by calculating the preliminary color separation ink amount set P such that it is proportional to the vector length LLI as described above, the color separation ink amount set P for the input color I can be easily calculated. The preliminary color separation ink amount set P may be calculated directly using the linear programming method based on the substitution ink amounts and the various ink duty limit mathematical expressions (Condition 1), as well as based on its relationship to the input color I and to the lengths LLI and LLm. In this case, the series of steps S120-S140 are performed at one time. The color reproduced using the preliminary color separation ink amount set P corresponds to the reproduction color, or the color reproduced on the printing medium, associated with the input color I.

In step S150 of FIG. 12, a final color separation ink amount set O is calculated based on the preliminary color separation ink amount set P. The final color separation ink amount set O is obtained by substituting chromatic primary color ink amounts in the preliminary color separation ink amount set P with spot color inks according to substitution ink amounts. Therefore, the color reproduced by the final color separation ink amount set O substantially matches the color reproduced by the preliminary color separation ink amount set P. Here, the substitution of chromatic primary color inks by spot color inks is carried out while taking into account the differences in their color reproducibility characteristics. The calculation of the final color separation ink amount set may be carried out according to the processing method described above (see FIGS. 9, 10, 11(a), and 11(b)) or according to the various methods described below.

By sequentially executing the operations of steps S100-S150 as described above, the final color separation ink amount set O in the reproduction color system is calculated for the input color I in the primary color system. The final color separation ink amount set O obtained in this fashion can be used as the second tone value set expressed in the reproduction color system in step S20 in FIG. 6.

In step S160 in FIG. 12, it is determined whether or not a final color separation ink amount set has been calculated for all input colors. If all final color separation ink amount set calculations have not been completed, the operations of steps S120-S150 are repeated, while if the all calculations have been completed, processing ends.

In order to shorten the time required for color separation processing, it is preferred that the number of outermost shell chromatic colors used for execution of the associated series of operations be restricted. Here, where no outermost shell chromatic color exist that corresponds to an input color for which color separation processing is to be performed, a corresponding final color separation ink amount set can be sought through interpolation of final color separation ink amounts for multiple other colors close to the input color. Here, it is preferred that multiple outermost shell chromatic colors be prepared beforehand such that the straight lines connecting such colors with the origin W are distributed throughout the color cube. This prevents interpolation errors regarding color separation ink amount sets from becoming significant in some areas.

As described above, in this embodiment, the determination of the extended chromatic color em and the outermost shell color separation ink amount set is performed such that the following conditions are satisfied:

(i) The outermost shell color separation ink amount set satisfies the ink amount limits.
(ii) The extended chromatic color vector is the longest in the reproducible color range by the ink set.
(iii) The total ink amount of the outermost shell color separation ink amount set used to reproduce the extended chromatic color em is the minimum amount.

Even where all of these conditions are not satisfied, if the extended chromatic color em has a higher saturation than the outermost shell chromatic color m, the color reproduction range can be expanded. For example, even where the condition (ii) is not satisfied and the extended chromatic color vector is not the longest, so long as it is longer than the outermost shell chromatic color vector, the color reproduction range is expanded.

In order to expand the color reproduction range to encompass a wider range of hues, it is preferred that the extended chromatic color vector be longer than the outermost shell chromatic color vector within a wider range of hues. Here, the range of hues within which the extended chromatic color vector can be lengthened depends on the hue of the usable spot color ink. A spot color ink can expand the color reproduction range of an image area having a hue close to the hue of the ink. As a result, by permitting more types of spot color ink having different hues to be used, the extended chromatic color vector can be made longer than the outermost shell chromatic color vector within a wider range of hues.

As described above, in this embodiment, color separation processing is performed so that a color range reproducible using chromatic primary color inks and spot color inks is effectively utilized. As a result, printing with an expanded color reproduction range can be carried out. Furthermore, because color separation processing is executed based on an extended chromatic color positioned at the point of intersection between an reproduction color outer shell plane and the straight line connecting the origin with an outermost shell chromatic color, color separation processing can be easily and effectively performed even where the number of available inks increases.

D. Embodiment of Final Color Separation Ink Amount Calculation Process:

D1. First Embodiment of Final Color Separation Ink Amount Calculation Process:

In this final color separation ink amount calculation process, the final color separation ink amount set O is calculated using the preliminary color separation ink amount set P for the input color I. The preliminary color separation ink amount set is an ink amount set usable for reproducing the reproduction color on the printing medium. The final color separation ink amount set O is calculated such that a color substantially identical to the color that would be reproduced using the preliminary color separation ink amount set P is reproduced within a range that satisfies the applicable ink duty limits (Condition 1). In order to reproduce a color substantially identical to the color that would be reproduced using the preliminary color separation ink amount set P, the ink amount combination obtained by substituting some ink amounts in the preliminary color separation ink amount set P according to the substitution ink amounts is used as the final color separation ink amount set O. Here, the degree of freedom in ink substitution increases as the number of usable inks increases. Therefore, multiple combinations of usable ink amounts that may be used as the final color separation ink amount set O sometimes exist. In this case, the final color separation ink amount set O is calculated while taking into account the differences in the color reproducibility characteristics of the chromatic primary color inks and the spot color inks.

Figure 15:
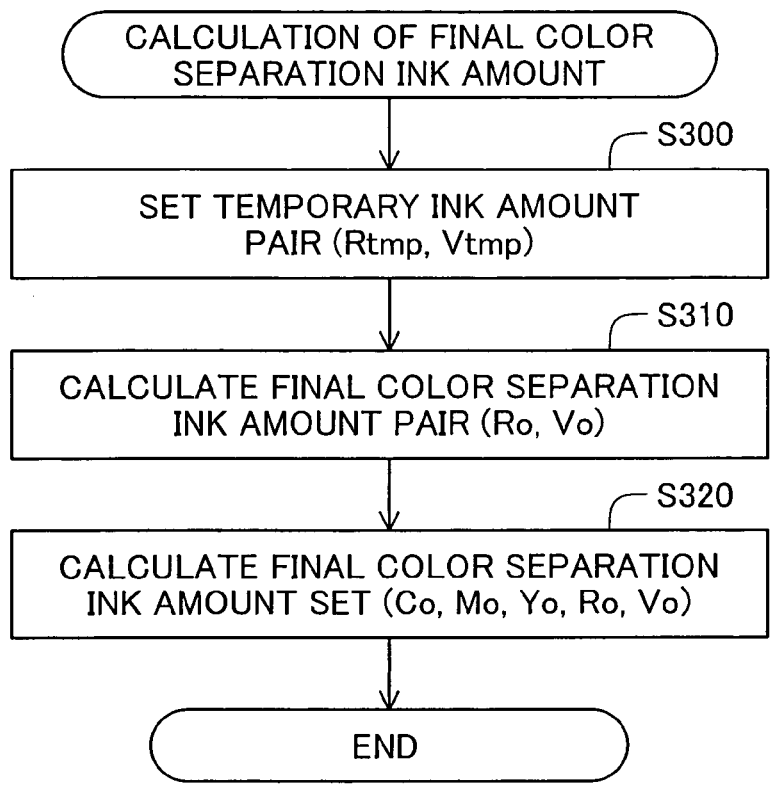
FIG. 15 is a flow chart showing the final color separation ink amount set calculation processing routine.

FIG. 15 is a flow chart showing the sequence of operations performed during calculation of the final color separation ink amount set in this embodiment. In the first step S300, the temporary ink amounts Rtmp, Vtmp for the spot color inks R, V are set. The temporary ink amounts Rtmp, Vtmp are used as indices for calculating the final color separation ink amounts Ro, Vo for the spot color inks R, V in step S310 described below.

When step S300 is performed, first, the saturation SR2 is calculated. The temporary ink amounts Rtmp, Vtmp are then set based on the saturation SR2 and the preliminary color separation ink amounts Rp, Vp.

Figure 16:
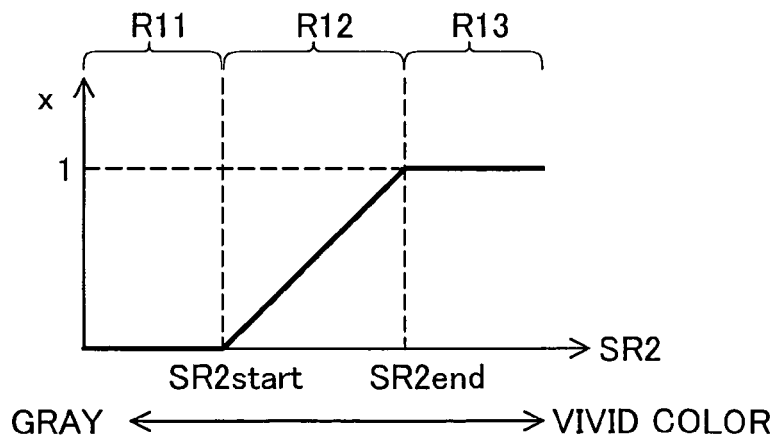
FIG. 16 is an explanatory drawing showing the relationship between the ratio of the temporary ink amount and the saturation.

FIG. 16 is a graph showing the relationship between the saturation SR2 and the ratio x of the temporary ink amount Rtmp to the preliminary color separation ink amount Rp. It differs from the graph in FIG. 10 in two respects. The first difference is that the saturation SR2 is set based on the color values Cm, Mm, Ym of the outermost shell chromatic color m instead of the color values Ci, Mi, Yi of the input color I. The second difference is that the ratio x in connection with the temporary ink amount Rtmp is related to the preliminary color separation ink amount Rp instead of to the maximum ink amount.

In this embodiment, the preliminary color separation ink amount Rp is used as the reference color separation ink amount used to determine the temporary ink amount Rtmp. The preliminary color separation ink amount Rp is a preliminary ink amount that enables the reproduction color to be reproduced. The preliminary color separation ink amount is calculated in step S510 of the color separation process shown in FIG. 8 or in step S140 of the color separation process shown in FIG. 12. The preliminary ink amount Rp calculated during the color separation process shown in FIG. 12 (see FIG. 13(c)) is obtained by multiplying the outermost shell color separation ink amount set emp for the outermost shell chromatic color m having the same vector direction as the input color I by the ratio of the vector length LLI for the input color I to the vector length LLm for the outermost shell chromatic color m. Therefore, where this embodiment is applied in step S150 of the color separation process shown in FIG. 12, the ink amount obtained by multiplying the outermost shell color separation ink amount set emp by the LLI/LLm ratio is used as the reference color separation ink amount.

The saturation SR is a difference between the largest tone value, i.e., max(Cm, Mm, Ym), and the smallest tone value, i.e., min(Cm, Mm, Ym) among the color components Cm, Mm, Ym for the outermost shell chromatic color m (see FIGS. 13(a)-13(c)). The outermost shell chromatic color m is indicated by a vector having the same direction as the vector that indicates the input color I in the primary color space shown in FIGS. 13(a)-13(c) and is positioned on the type 1 outer shell plane. The difference between the largest tone value and the smallest tone value for the color values Cm, Mm, Ym decreases as the input color I approaches achromaticity. Therefore, as the input color I approaches achromaticity, the value of the saturation SR2 decreases, and becomes zero when the input color I is achromatic. Note that the reproduction color is determined based on the input color I. Therefore, the saturation SR2 is correlated to both the saturation of the input color I and the saturation of the reproduction color. Consequently, the saturation SR2 can be used as a saturation parameter value.

In this embodiment, as the saturation SR2 decreases, the ratio x of the temporary ink amount Rtmp to the preliminary color separation ink amount Rp decreases as well, as shown in FIG. 16. Furthermore, this embodiment includes two values SR2start and SR2end by which to determine the level of the saturation SR2. In a first range R11 in which SR2≦SR2start, the temporary ink amount Rtmp is set to zero, i.e., Rtmp=0 and x=0. In a third range R13 in which SR2end≦SR2, the temporary ink amount Rtmp is set to equal the preliminary color separation ink amount Rp, i.e., Rtmp=Rp and x=1. In a second range R12 in which SR2start<SR2<SR2end, the ratio x linearly changes.

The setting of the ratio x, i.e., of the temporary ink amount Rtmp, can be understood as follows. The spot color inks R and V have a higher saturation than the chromatic primary color inks. Therefore, in order to enable reproduction of more vivid image areas, it is preferred that a large amount of high-saturation spot color ink be used in high-saturation image areas. Low-saturation near-achromatic image areas, on the other hand, can be reproduced using chromatic primary color inks alone, without the need for spot color inks. Therefore, in order to effectively apportion ink usage between chromatic primary color inks and spot color inks, it is preferred that the use of high-saturation spot color inks in low-saturation image areas be minimized. In the example of FIG. 16, the ratio x decreases as the saturation SR2 decreases. In the low-saturation range R11, the temporary ink amount Rtmp is set to a value whereby the image area is reproduced without the use of this spot color ink (i.e., to zero). In the high-saturation range R13, the temporary ink amount Rtmp is set to a value such that red ink R is deliberately used (i.e., is set to the preliminary color separation ink amount Rp). Therefore, making the amount of red ink R equivalent to the temporary ink amount Rtmp enables higher-saturation image areas to be reproduced and enables ink usage to be more effectively apportioned between chromatic primary color inks and spot color inks taking into account the differences in the color reproducibility characteristics thereof.

Figure 17:
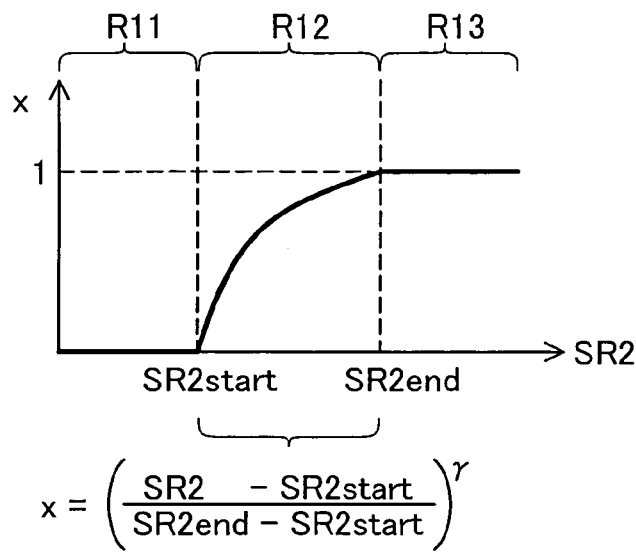
FIG. 17 is an explanatory drawing showing the relationship between the ratio of the temporary ink amount and the saturation.

The first and second values SRstart and SRend can be established via evaluation based on human perception. For example, a gradation pattern in which the saturation varies from 0% to 100% is printed using mixtures of chromatic primary color inks C, M and Y only. The same gradation pattern is printed using spot color ink. Within the low saturation SR range, colors are adequately reproduced using the chromatic primary color inks only without the use of the spot color ink. In other words, color reproducibility is substantially identical when the two gradation patterns are compared. The saturation value at which the spot color ink starts to lose effect as described above may be used as the first value SR2start. Within the high saturation SR range, the spot color ink provides notable vividness and improves color reproducibility. The saturation value at which the increased vividness provided by the spot color inks becomes marked may be used as the second value SR2end. No matter what method is used, a construction wherein the ratio of the temporary ink amount Rtmp to the preliminary color separation ink amount Rp decreases as the saturation parameter value SR decreases permits higher-saturation images to be reproduced and enables the apportionment of ink usage between chromatic primary color inks and spot color inks to be performed taking into account the differences in the color reproducibility characteristics of the inks. Furthermore, other values equivalent to a saturation parameter value may be used in place of the saturation SR2 in a similar method In addition, in this embodiment, the ratio x or the temporary ink amount Rtmp changes smoothly over the entire range of the saturation SR2. As a result, in a gradation area in which the ink amount changes continuously, the problem of sudden changes in the ink amounts of the constituent inks and resulting conspicuous borders between different colors can be minimized. Moreover, the ratio x is not limited to a construction wherein it changes linearly relative to the saturation SR2. FIG. 17 is a graph showing a different example of the relationship between the ratio x and the saturation SR2. It differs from the graph shown in FIG. 16 in that within the second saturation range R12, the ratio x changes in accordance with an exponential product of the saturation SR2. Here, if the exponent γ is set at a value smaller than 1, the relationship between the ratio x and the saturation SR2 can be set such that the curve formed thereby becomes rounded at the top in the second and third ranges R12 and R13. Therefore, the rate of change in the ratio x can be set to decrease as the saturation SR2 increases. As a result, the change in the ink amounts of the respective color components can be prevented from becoming conspicuous within the high saturation SR range. Where the exponent γ is set to a value larger than 1, the relationship between the ratio x and the saturation SR2 in the second range R12 can be set to a relationship expressed by a curve that is rounded at the bottom. Therefore, the rate of change in the ratio x can be set to decrease as the saturation SR2 decreases. As a result, the change in the ink amounts of the respective color components can be prevented from becoming conspicuous within the low saturation SR range. In either case, by ensuring that the ratio x changes continuously over the entire range of the saturation SR2, a sudden change in the ink amounts of the respective color components, and a resulting conspicuous border between colors, can be minimized.

In the examples of FIGS. 16 and 17, the temporary ink amount Rtmp for red ink R is calculated, but a temporary ink amount for a different spot color ink may be calculated in the same fashion. In either case, the ratio of the temporary ink amount to the preliminary color separation ink amount decreases as the saturation decreases. Furthermore, the first value SR2start and second value SR2end used to determine the level of the saturation SR2 (see FIGS. 16 and 17) may differ for each ink. This enables color separation processing to be performed in which apportionment between the chromatic primary color inks and the spot color inks is carried out taking into account differences in the color reproducibility characteristics of the various inks.

In step S310 in FIG. 15, the final color separation ink amounts Ro, Vo for the spot color inks R, V are calculated based on the temporary ink amounts Rtmp, Vtmp established in step S300 described above. The temporary ink amounts Rtmp, Vtmp are calculated taking into account differences in the color reproducibility characteristics of the chromatic primary color inks and the spot color inks. However, an ink amount combination including Rtmp and Vtmp may not satisfy the ink duty limits (Condition 1). In addition, there are cases in which the color reproduced by the preliminary color separation ink amount set P obtained in step S140 in FIG. 12 is not reproducible with the temporary ink amounts Rtmp, Vtmp. In such a case, it is necessary to modify the ink amounts to ensure that the reproduction color is attained. In step S310, ink amounts close to the temporary ink amounts Rtmp, Vtmp are calculated as the final color separation ink amounts Ro, Vo within the range in which these limits are satisfied.

Figure 18A:
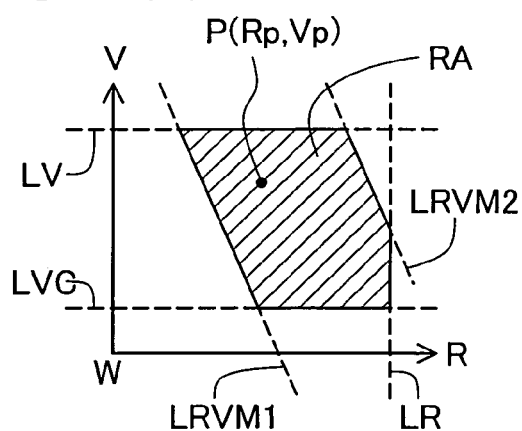
FIGS. 18(a)-18(c) are explanatory drawings showing the elements of the calculation of the final color separation ink amount for a spot color ink.
Figure 18B:
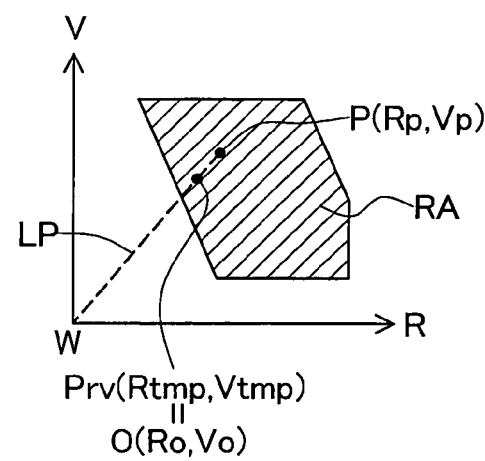
Figure 18C:
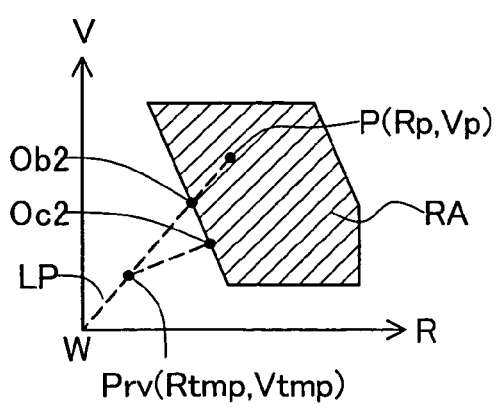

FIGS. 18(a)-18(c) illustrate calculation of the color coordinate point Prv(Ro, Vo) of the final color separation ink amount pair. FIGS. 18(a)-18(c) each show a two-dimensional color space in which the R and V ink amounts are indicated as base vectors. The horizontal axis represents the red ink R ink amount, while the vertical axis represents the violet ink V ink amount. A combination of red ink R and violet ink V ink amounts is indicated as a point in each drawing.

FIG. 18(a) shows the range of possible values for the final color separation ink amounts Ro, Vo. The final color separation ink amounts Ro, Vo are set to fall within an permissible range that satisfies the conditions shown below.

(Condition 1b)
The final color separation ink amount for each of the CMYRV inks satisfies ink duty limits.

(Condition 2b)
The final color separation ink amounts for the CMYRV inks are a combination of ink amounts that can be obtained based on the preliminary color separation ink amount P via ink substitution according to the substitution ink amounts (see FIGS. 5(a)-5(c)).

"Condition 1b" above is identical to "Condition 1" described before. Furthermore, these conditions can be indicated as lines in FIG. 18(a). Therefore, the permissible range can be shown as an area enclosed by lines corresponding to these conditions. In the example of FIG. 18(a), for purposes of simplification, the area enclosed by the five straight lines LR-LRMV2 is deemed the permissible range RA.

The straight line LR corresponds to the upper limit value for the red ink R. The amount of red ink R can be increased by substituting other inks with red ink R according to the substitution ink amounts (see FIGS. 5(a)-5(c)). However, there is an upper limit because of the limitations by both the ink duty limit on red ink R and the maximum amount of red ink R determined based on the preliminary color separation ink amount set P and the substitution ink amounts. The straight line LR corresponds to the upper limit value that satisfies both of these limitations.

The straight line LV corresponds to the upper limit value for the violet ink V. The meaning of this straight line is identical to that of the straight line LR described above.

The straight line LVC corresponds to the lower limit value for the violet ink V. The amount of violet ink V can be reduced by substituting it with the two chromatic primary color inks C and M, but the chromatic primary color ink amounts increase as a result. Therefore, the lower limit value for the violet ink V is limited by ink duty limits on the primary color inks. The straight line LVC corresponds to the lower limit value that satisfies these limits.

The straight line LRVM1 corresponds to the lower limit values for the two inks R and V. The ink amounts for the red ink R and violet ink V can be reduced by substituting them with two chromatic primary color inks, respectively. However, this increases the amount of the primary ink color component that is common to the inks R and V (see FIGS. 5(b) and 5(c); in this example, the amount of magenta ink M). The amount of magenta ink M is limited by both the ink duty limit on the amount of magenta ink M and the maximum ink amount for magenta ink M determined by the preliminary color separation ink amount set P and the substitution ink amount. Therefore, the lower limit values for the ink R and ink V ink amounts are limited to the range in which the upper limit ink amount for magenta ink M is sufficient to enable its use in place of the inks R and V. Under this limit, the lower limit values for the ink R and ink V ink amounts are inversely proportional to each other. The straight line LRVM1 corresponds to the lower limit values for the inks R and V determined in this fashion.

The straight line LRVM2 corresponds to the upper limit values for the two inks R and V. The red ink R and violet ink V ink amounts can be increased by using these inks to substitute for two chromatic primary color inks, respectively. However, this reduces the amount of the principal component primary color ink component common to the inks R and V (that is, magenta ink M). Therefore, the upper limit values for the two inks R and V are limited to the range in which the maximum ink amount for magenta ink M can be apportioned between the inks R and V. Under this limitation, the upper limit amounts for the two inks R and V are inversely proportional to each other. The straight line LRVM2 corresponds to the upper limit values for the two inks R and V determined in this fashion.

In step S310 in FIG. 15, within the permissible range RA obtained as described above, the combination of ink amounts close to the temporary ink amount pair color coordinate point Prv(Rtmp, Vtmp) is calculated as the final color separation ink amounts Ro, Vo.

FIG. 18(b) shows a case in which the temporary ink amount pair color coordinate point Prv resides within the permissible range RA. In this case, the temporary ink amounts Rtmp, Vtmp are used as the final color separation ink amounts Ro, Vo as is. This enables the final color separation ink amounts Ro, Vo to be calculated taking into account the differences in the color reproducibility characteristics of the chromatic primary color inks and the spot color inks. In addition, because the same ratio x (see FIGS. 16 and 17) is used for the two spot color inks R and V in the example of FIGS. 18(a)-18(c), the temporary ink amount pair coordinate point Prv is indicated as a point on a straight line LP connecting the origin W and the preliminary color separation ink amount coordinate point P.

FIG. 18(c) shows a case in which the temporary ink amount pair color coordinate point Prv resides outside the permissible range RA. In this case, the combination of ink amounts indicated by the point Ob2, which is the closer of the points of intersection between the straight line LP and the borders of the permissible range RA to the temporary ink amount pair color coordinate point Prv, is used as the final color separation ink amounts Ro, Vo. The straight line LP is a line by which a fixed proportional relationship is maintained between the temporary ink amounts Rtmp and Vtmp. Using a point on this straight line LP prevents the occurrence of a situation in which the ink amount for one of the spot color inks R and V is reduced excessively without the other ink amount being reduced sufficiently as well.

The ink amount combination used in the final color separation ink amount set is not limited to the combination represented by the point Ob2 described above. So long as it is a combination indicated as a point that is within the permissible range RA and is positioned close to the temporary ink amount pair color coordinate point Prv, a final color separation ink amount set that takes into account the differences in the color reproducibility characteristics of the chromatic primary color inks and the spot color inks can be obtained. For example, the combination of ink amounts represented by a point Oc2 that is closest to the temporary ink amount pair color coordinate point Prv in the permissible range RA may also be used. In either case, using a combination of ink amounts indicated as a point that is within the permissible range RA and is close to the temporary ink amount pair color coordinate point enables the differences in the color reproducibility characteristics to be taken into account during the calculation of the final color separation ink amounts Ro, Vo. Furthermore, if different ratios x are used for the two spot color inks R and V (see FIGS. 16 and 17), respectively, the temporary ink amount pair point Prv may not be positioned on the straight line LP. In this case as well, it is preferred that a combination of ink amounts indicated by a point that is within the permissible range RA and is positioned close to the temporary ink amount pair color coordinate point Prv be used as the final color separation ink amounts Ro, Vo. In such a case, the final color separation ink amounts Ro, Vo may be calculated using the method shown in FIG. 11(b), for example.

In step S320 of FIG. 15, the final color separation ink amounts for all inks in the ink set are calculated. For the spot color ink final color separation ink amounts Ro, Vo, the ink amounts calculated in step S310 are used. The chromatic primary color ink final color separation ink amounts Co, Mo, Yo are calculated based on the preliminary color separation ink amount set P and the substitution ink amounts.

As described above, the final color separation ink amount set calculation process of this embodiment takes into account the differences in the color reproducibility characteristics of chromatic primary color inks and spot color inks. Where the image area to be reproduced has a high saturation, color reproducibility can be improved and the saturation of the image area can be increased by using a larger amount of spot color inks. Where the image area to be reproduced has a low saturation, spot color inks can be conserved by reducing the amount thereof used. Therefore, spot color inks can be used efficiently.

In a relatively high-lightness area, the ink amount for each ink in the ink set is far small relative to the ink duty limits. Accordingly, a larger number of ink amount combinations satisfy the ink duty limits. As a result, where the temporary ink amounts Rtmp, Vtmp for spot color inks are zero, the final color separation ink amounts Ro, Vo become zero. Such ink amounts (Ro=Vo=0) are set for certain reproduction colors as to which the saturation SR2 falls within the first range R11 regardless of hue. Therefore, because colors in areas having a relatively high lightness and low saturation are reproduced without using spot color inks, spot color inks can be conserved.

In image areas having a relatively low brightness (i.e., in areas having a relatively high density), because the ink amount for each ink in the ink set increases relative to the ink duty limits, the permissible range for each ink amount value tends to shrink. As in the case in which this embodiment is applied in the color separation process shown in FIG. 12, where color separation processing is executed while taking into account the expansion of the color reproducibility range, a preliminary color separation ink amount set (temporary ink amount set) is calculated to enable reproduction of higher-saturation image areas, i.e., higher density image areas. Therefore, in order to minimize the total of the ink amounts while reproducing a high-density image area, the spot color ink final color separation ink amounts Ro, Vo may be set to values greater than zero. These ink amounts are set for reproducing colors that are close to achromatic regardless of hue. By using spot color inks in relatively low-lightness areas even for nearly achromatic colors in this fashion, the color reproduction range can be expanded to include higher-density areas.

The low-brightness range in which the final color separation ink amounts Ro, Vo for the spot color inks R and V for a reproduction color are values greater than zero even when the saturation SR2 falls within the first range R11 is determined based on the ink duty limits. Alternatively, the low-lightness range may be established independently of the ink duty limits. In this case as well, setting the low-lightness range such that the final color separation ink amount set satisfies ink duty limits enables the problems of ink bleeding and warping of the printing medium to be prevented.

Figure 19:
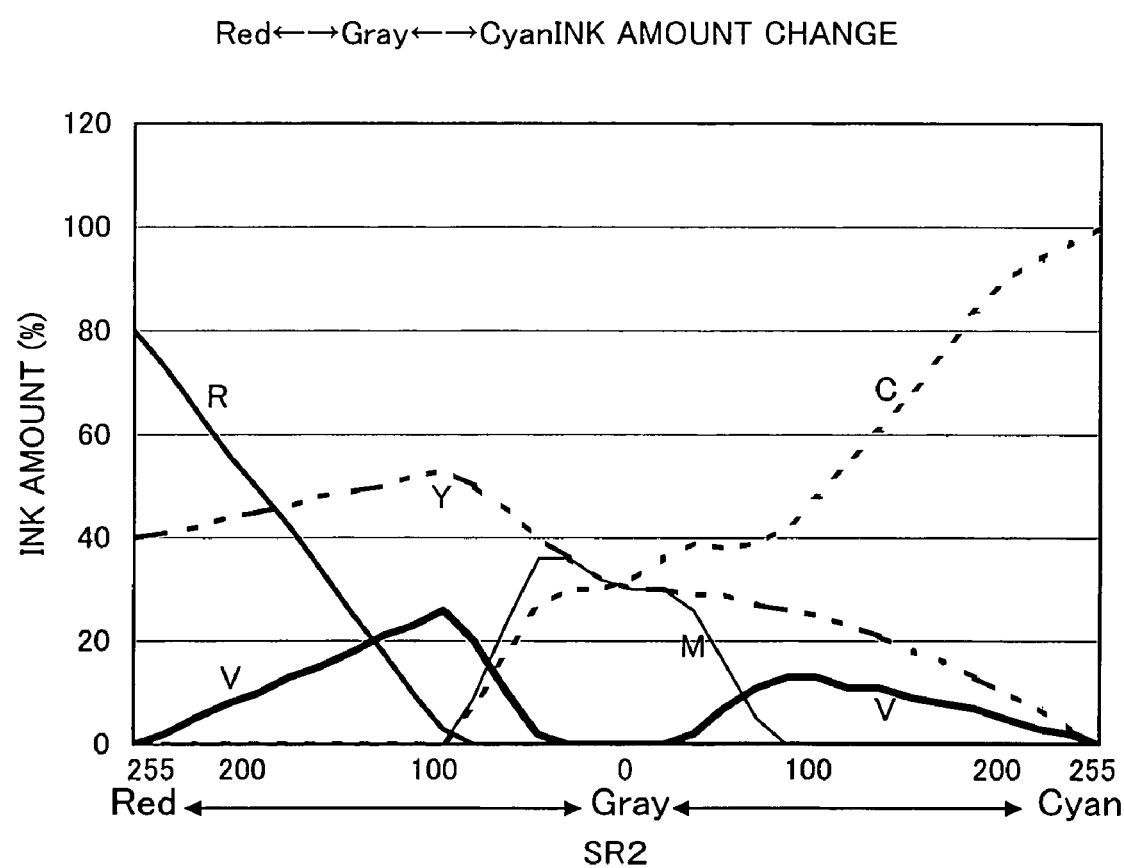
FIG. 19 is an explanatory drawing showing the ink amount for each ink.

FIG. 19 shows ink amounts obtained using a color conversion lookup table LUT created based on the final color separation ink amount calculation process of this embodiment. In the example of FIG. 19, the change in each ink amount where an image area that changes in color from red to cyan via gray (an achromatic color) is shown. The horizontal axis represents the saturation SR2, and is defined as a range from 0 to 255. The left half of the graph shows the saturation SR2 where the color changes from red to gray, and the right half shows the saturation SR2 where the color changes from gray to cyan. The vertical axis represents the ink amount or dot recording rate. "Dot recording rate" means the ink amount relative to the ink amount of a single ink used to print a solid area, which is deemed 100%.

In this example, the RGB color system is used as the color system for the input color image data in the color conversion lookup table LUT. Each RGB color component is expressed as 256 tone levels ranging in value from 0 to 255. In the example of FIG. 19, the input color image data changes along a straight line that extends from red (R,G,B=255,0,0) to cyan (R,G,B=0,255,255) via gray (R,G,B=128,128,128) (i.e., a diagonal line in the three-dimensional color cube defined by RGB).

In the example of FIG. 19, when the saturation is relatively low (specifically, when the saturation SR2 is no more than 90/255), the spot color ink amounts R, V are set such that they decrease as the saturation parameter value SR2 decreases, as well as so that they decrease at a faster rate than the rate of reduction in the saturation parameter value SR2. In general, it is preferred that when the saturation parameter value falls within a prescribed range close to achromaticity, the spot color ink amounts be set such that they decrease as the saturation parameter value decreases, and that they decrease at a faster rate than they would if their rate of reduction were proportional to the rate of reduction in the saturation parameter value SR2. This enables more vivid image areas to be reproduced using spot color inks while at the same time conserving the amount of spot color inks used.

Furthermore, in the example of FIG. 19, when the saturation is relatively low (the saturation SR2 is no more than 50/255), the ink amounts for the spot color inks R and V are set such that they do not exceed the respective ink amounts for the chromatic primary color C, M and Y inks. In general, it is preferred that when the saturation parameter value falls within a prescribed near-achromatic range, the ink amounts for the spot color inks be adjusted such that they do not exceed the respective ink amounts for the chromatic primary color inks. This enables the amount of spot color inks to be reduced appropriately within a relatively low-saturation range.

Furthermore, in the example of FIG. 19, when the saturation is relatively low (specifically, the saturation SR2 is no more than 25/255), the spot color inks are not used and the image is reproduced using only the chromatic primary color inks C, M and Y. In general, it is preferred that when the saturation parameter value falls within a prescribed near-achromatic range, the spot color ink amounts be adjusted to zero. This enables the use of spot color inks to be conserved. In addition, as the saturation increases toward red, the ink amount of the spot color ink R having a hue close to the color of red increases. As a result, a red color with a higher saturation can be reproduced. As the saturation increases toward cyan, the ink amount of the chromatic primary color ink C having a hue close to the color of cyan increases.

In this embodiment, the temporary ink amounts Rtmp, Vtmp are set to values smaller than the preliminary color separation ink amounts Rp, Vp when the saturation parameter value SR2 falls within a range below the second value SR2end (see FIGS. 16 and 17). Accordingly the final color separation ink amounts Ro, Vo are set to values smaller than the preliminary color separation ink amounts Rp, Vp. It should be noted that the preliminary color separation ink amounts Rp, Vp determined based on the substitution ink amount in this embodiment correspond to the hypothetical ink amounts of the present invention.

The final color separation ink amount set calculation process described above can be executed in the same manner even when a larger number of spot color inks are used. For example, if three spot color inks are used, first, the temporary ink amount for each spot color ink is calculated. A combination of ink amounts indicated as a point that is within the permissible range (shown as a cube in a color space in which the three ink amounts are represented as base vectors) and is close to the point representing the temporary ink set may be used as the spot color ink final color separation ink amount set.

As described above, in this embodiment, color separation processing based on extended chromatic colors having large tone values is performed using chromatic primary color inks and spot color inks. Therefore, color separation processing that takes into account the expansion of the color reproduction range can be easily performed. Furthermore, because in the low-saturation range, the spot color ink amounts are set to small values, the spot color inks can be conserved. Moreover, because the final color separation ink amount set calculation process is performed taking into account the differences in the color reproducibility characteristics of chromatic primary color inks and spot color inks, color separation processing that effectively apportions duties between the chromatic primary color inks and the spot color inks can be carried out.

It is acceptable if the method applied in the final color separation ink amount set calculation operation S520 of the color separation process shown in FIG. 8 (see FIGS. 9, 10, 11(a) and 11(b)) is used for the final color separation ink amount set calculation operation S150 of the color separation process of this embodiment (see FIG. 12) instead of the various methods shown with reference to FIGS. 15-19. Similarly, any of the various methods applied in the final color separation ink amount set calculation operation S150 of the color separation process of this embodiment (see FIG. 12) may be used in the final color separation ink amount set calculation operation S520 of the color separation process shown in FIG. 8 instead of the method shown with reference to FIGS. 9, 10, 11(a) and 11(b).

Figure 20:
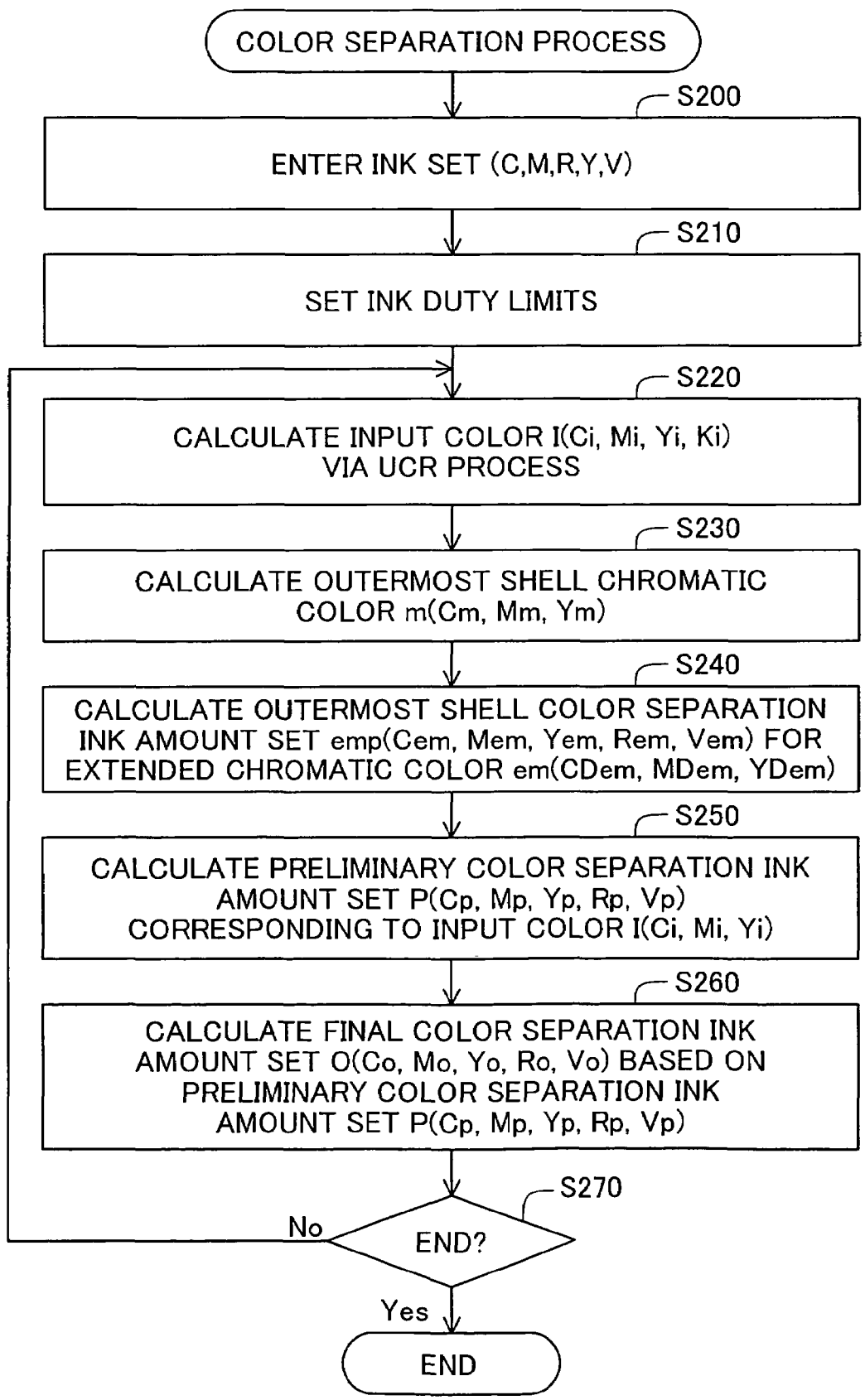
FIG. 20 is a flow chart showing a color separation processing routine.

E. Third Embodiment of Color Separation Process:

FIG. 20 is a flow chart showing the sequence of operations of a third embodiment of the color separation process. It differs from the color separation process shown in FIG. 12 in that a UCR (Under Color Removal) operation S220 is performed using black ink K. The UCR operation of this embodiment involves a process in which part of the tone values for chromatic primary color ink C, M and Y is substituted by a tone value for black ink K. Because the UCR process can be performed using any of several well-known methods, it will not be described in detail herein.

In step S200, the ink set including chromatic primary color inks of C, M and Y, spot color inks of R and V, and black K are entered as the available ink set.

Next, in step S210, ink duty limits that impose limits on the amount of each ink in the ink set are established. The difference between these ink duty limits and the ink duty limits shown in FIG. 12 is that they are established taking into account the ink amount of the black ink K (details described below).

In step S220, UCR processing is performed to the input color that is to undergo color separation processing (for example, the color expressed by the primary color tone value set in step S20 in FIG. 6). As a result, an input color I expressed by the CMYK tone values Ci, Mi, Yi, Ki is obtained. In this embodiment, color separation processing is performed using extended chromatic colors em with regard to the CMY tone values Ci, Mi, Yi among these four tone values. The operations of steps S230-S270 are identical to the operations of steps S120-S160 shown in FIG. 12. As a result, color separation ink amounts Co, Mo, Yo, Ro, Vo are obtained for the CMY tone values Ci, Mi, Yi. For the black ink K, the tone value Ki obtained from the UCR process in step S220 is used as the color separation ink amount Ko.

As described above, in the color separation process of the third embodiment, color separation processing is performed that effectively uses a color range that can be reproduced using black ink K as well as chromatic primary color inks CMY and spot color inks RV. This enables printing to be performed with an expanded color reproduction range.

Furthermore, in this embodiment, it is preferred that the amount of black ink K be taken into account when establishing the ink duty limits described above (Condition 1). For example, the limit on the total amount of all ink colors shown in Mathematical expressions 2 may be established such that the total value of all CMYRV ink amounts and the black ink amount Ki obtained in step S220 does not exceed Duty_T. This would prevent an amount of ink that exceeds the ink absorption capacity of the printing medium from being discharged. In addition, when ink amount limits are established for color mixtures of multiple color inks, such limits may take into account the ink amount Ki of black ink K. It is preferred that the individual limit on the amount of black ink K be taken into account when the ink amount Ki is calculated during the UCR process of step S220.

When the color separation process of this embodiment is applied in the color conversion lookup table creation process of step S20 shown in FIG. 6, the second tone value set includes tone values expressed as ink amounts for chromatic primary color inks CMY, spot color inks RV and black ink K. Therefore, in step S30, color patches reproduced using the colors CMYRVK are created.

F. Variations of Ink Set:

In the embodiments described above, various ink sets other than the ink set shown in FIGS. 5(a)-5(c) may be applied. FIGS. 21(a) through 28 are explanatory drawing showing each ink component in examples of possible ink sets. Because the ingredients of the black ink K and the ingredients other than the colorants in each ink are identical to those shown in FIG. 5(a), they are not shown in these figures. The difference between these ink sets and the ink set shown in FIG. 5(a) is that different colorants and concentrations are used for some inks in each ink set. As a result, these ink sets can provide improved color reproducibility for colors that vary slightly from one ink set to another. Therefore, higher quality printing results can be obtained by selecting and using an ink set that is suitable for the image to be printed.

Substitution ink amounts for red ink R and violet ink V obtained via color measurement of color patches are shown in connection with the ink sets of FIGS. 21(a)-21(c) through 26(a)-26(c). The total substitution ink amount is at least 1.7 for any ink set, as shown in the figures. Consequently, higher-saturation colors can be reproduced by using spot color inks in amounts approximately equal to those used when mixing chromatic primary color inks. Therefore, by using both chromatic primary color inks and spot color inks, a wider range of colors can be reproduced than can be reproduced using chromatic primary color inks alone.

The ink types are not limited to the formulations shown in FIGS. 5(a)-5(c) and FIGS. 21(a) through 28, and appropriate inks based on other formulations may be used. Furthermore, the colors and numbers of the inks to be used are not limited to these combinations shown. For example, it is acceptable if red ink is the only available spot color ink, or if green ink and blue ink are used as spot color inks. However, it is preferred that inks that can be used in combination to reproduce achromatic colors be used as chromatic primary color inks, and that an ink having hues different from any of the chromatic primary color inks be used as a spot color ink. Using an ink set having this composition enables expansion of the color reproduction range to be taken into account during color separation processing.

As described above, in these embodiments, because the spot color ink amounts are set such that they decrease in the low-saturation range, the spot color inks can be conserved. Furthermore, because the final color separation ink amount set calculation process is carried out taking into account the differences in the color reproducibility characteristics of chromatic primary color inks and spot color inks, color separation processing that effectively apportions duties between the chromatic primary color inks and the spot color inks can be carried out.

The final color separation ink amount set calculation process (i.e., step S260 in FIG. 20, step S150 in FIG. 12 or step S520 in FIG. 8, for example) is not limited to the processes described above (see FIGS. 9-11(a), 11(b) or FIGS. 15-19), and may generally include any process that sets each ink amount such that the resulting ink amount set can reproduce the reproduction color and that the amounts of spot color inks are reduced in the low-saturation range.

The present invention is not limited to the examples and embodiments described herein, and may be realized in various forms within the essential scope thereof. It may be realized in the forms or the variations described below, for example.

G. Variations:

G1. Variation 1:

The saturation parameter value is not limited to the value SR or SR2 described above (see FIG. 10 or FIG. 16, respectively), and any of various values which are related to the saturation of the reproduction color may be used. For example, when the straight line connecting the origin W and the point K in the primary color space shown in FIG. 13 is termed the line of achromaticity, the distance between a particular color point in the primary color space and the line of achromaticity may be used as the saturation parameter value for the particular color point. When this is the case, a saturation calculated based on a reproduction color shown in the primary color space can be used. Because the reproduction color is related to an input color I, the saturation calculated based on the input color I can also be used as a saturation parameter value related to the saturation of the reproduction color.

If the range of available saturation parameter values is deemed to range from 0% (gray) to 100% (vivid color), it is preferred that within the saturation parameter value range, the first range closest to achromaticity in which the spot color ink amount is set at zero include the range from 0% to 5%. It is more preferred that such range include the range from 0% to 10%, and most preferred that the range include the range from 0% to 15%. It is preferred that spot color inks be used in a low-lightness image area even where the saturation parameter value falls within the first range. This enables richer-color image areas to be reproduced by using the spot color inks R and V even where the ink amount for each of the various inks is limited by an ink duty limit on all inks. In addition, it is preferred that the first range be adjusted in accordance with the lightness of the image area to be reproduced. This enables ink usage to be shared between the chromatic primary color inks and the spot color inks with increased precision.

G2. Variation 2:

In the above embodiments, the hues of the respective inks belonging to the available ink set are different from each other, but it is acceptable to use multiple inks that have substantially the same hue but different concentrations. In this case, by allocating ink usage to inks having different concentrations in accordance with the tone value for each hue, graininess (image granularity) that becomes more noticeable as the number of ink dots decreases can be improved, and banding (line patterning), which becomes more noticeable when the number of ink dots is large, can be minimized. The ink amount for each ink can be calculated using so-called linear programming, in which such conditions as the ink duty limits and substitution ink amounts described above are established taking into account the ink amounts for all inks. Alternatively, a method may be used in which color separation ink amounts are calculated for each hue and the obtained separation ink amount for a hue is redistributed among multiple inks having substantially the same hue but different concentrations. In this case as well, it is preferred that ink duty limits be established taking into account the ink amounts for all inks, and that the final ink amounts for each ink satisfy the ink duty limits.

Moreover, in each embodiment above, "ink amount" is a tone value for each ink expressed in a range of 0%-100% where the ink amount when a solid area is reproduced is deemed 100%, and refers to the output value in the color conversion lookup table LUT. Where multiple inks having substantially the same hue but different concentrations are available, color separation processing can be carried out by having the aggregate total of the colorants of inks having a substantially identical hue but different concentrations correspond to the "ink amount". In this case, an appropriate color can be reproduced by redistributing the obtained "ink amount" among the inks having the same hue but different concentrations.

G3. Variation 3:

The present invention may also be applied in thermal transfer printers or drum scan printers. The present invention can be applied not only in so-called ink jet printers, but also in printing apparatuses that reproduce colors based on the mixing of ink colors. Such apparatuses include facsimile machines and copying machines, for example.

The present invention was described in detail above with reference to the drawings, but the examples and embodiments herein are shown only as examples, and the present invention is not limited thereto. The ideas and scope of the present invention are limited solely by the accompanying claims.

What is claimed is:

1. A color separation method for determining amounts of a plurality of color inks in order to reproduce an arbitrary color with the plurality of color inks on a printing medium, the method comprising the steps of:
   (a) defining an ink set that includes as useable inks a plurality of chromatic primary color inks that when used in combination can reproduce achromatic color, and at least one spot color ink of hue different from any of the plurality of chromatic primary color inks;
   (b) determining a plurality of reproduction colors to be reproduced on a print medium according to a plurality of input colors within a chromatic primary color space, a term "reproduction color" denoting a color to be reproduced on the print medium according to any one input color, a term "color separation ink amount set" denoting a combination of ink amounts of the ink set for reproducing a reproduction color on the print medium, a term "chromatic primary color space" denoting a color space having base vectors representing ink amounts of the plurality of chromatic primary color inks; and
   (c) determining a plurality of color separation ink amount sets for reproducing the plurality of reproduction colors, wherein the step (c) includes, for each reproduction color, the steps of:
   (c1) calculating a color saturation parameter value correlated to saturation of the reproduction color; and
   (c2) adjusting an ink amount of the spot color ink in the color separation ink amount set for the reproduction color such that the ink amount of the spot color ink decreases as the saturation parameter value changes in a direction of lower saturation when the color saturation parameter value falls within a prescribed first low-saturation range that is close to achromaticity, and
   wherein in the step (c2), when the saturation parameter value falls within a range that is close to achromaticity and that is at least part of the first low-saturation range, the spot color ink amount in the color separation ink amount set is adjusted so as to be lower than ink amounts of the chromatic primary color inks in the same color separation ink amount set.

2. A color separation method for determining amounts of a plurality of color inks in order to reproduce an arbitrary color with the plurality of color inks on a printing medium, the method comprising the steps of:
   (a) defining an ink set that includes as useable inks a plurality of chromatic primary color inks that when used in combination can reproduce achromatic color, and at least one spot color ink of hue different from any of the plurality of chromatic primary color inks;
   (b) determining a plurality of reproduction colors to be reproduced on a print medium according to a plurality of input colors within a chromatic primary color space, a term "reproduction color" denoting a color to be reproduced on the print medium according to any one input color, a term "color separation ink amount set" denoting a combination of ink amounts of the ink set for reproducing a reproduction color on the print medium, a term "chromatic primary color space" denoting a color space having base vectors representing ink amounts of the plurality of chromatic primary color inks; and
   (c) determining a plurality of color separation ink amount sets for reproducing the plurality of reproduction colors, wherein the step (c) includes, for each reproduction color, the steps of:
   (c1) calculating a color saturation parameter value correlated to saturation of the reproduction color; and
   (c2) adjusting an ink amount of the spot color ink in the color separation ink amount set for the reproduction color such that the ink amount of the spot color ink decreases as the saturation parameter value changes in a direction of lower saturation when the color saturation parameter value falls within a prescribed first low-saturation range that is close to achromaticity, and
   wherein in the step (c2), when the saturation parameter value falls within a range that is close to achromaticity and that is at least part of the first low-saturation range, the spot color ink amount in the color separation ink amount set is adjusted so as to decrease at a greater rate than a rate proportional to the saturation parameter value.

3. A color separation method for determining amounts of a plurality of color inks in order to reproduce an arbitrary color with the plurality of color inks on a printing medium, the method comprising the steps of:
   (a) defining an ink set that includes as useable inks a plurality of chromatic primary color inks that when used in combination can reproduce achromatic color, and at least one spot color ink of hue different from any of the plurality of chromatic primary color inks;
   (b) determining a plurality of reproduction colors to be reproduced on a print medium according to a plurality of input colors within a chromatic primary color space, a term "reproduction color" denoting a color to be reproduced on the print medium according to any one input color, a term "color separation ink amount set" denoting a combination of ink amounts of the ink set for reproducing a reproduction color on the print medium, a term "chromatic primary color space" denoting a color space having base vectors representing ink amounts of the plurality of chromatic primary color inks; and
   (c) determining a plurality of color separation ink amount sets for reproducing the plurality of reproduction colors, wherein the step (c) includes, for each reproduction color, the steps of:
   (c1) calculating a color saturation parameter value correlated to saturation of the reproduction color; and
   (c2) adjusting an ink amount of the spot color ink in the color separation ink amount set for the reproduction color such that the ink amount of the spot color ink decreases as the saturation parameter value changes in a direction of lower saturation when the color saturation parameter value falls within a prescribed first low-saturation range that is close to achromaticity, and
   wherein in the step (c2), when the saturation parameter value falls within a range that is close to achromaticity and that is at least part of the first low-saturation range, the spot color ink amount is adjusted such that actual ink amount of the spot color ink is smaller than a hypothetical ink amount, the hypothetical ink amount being an ink amount of the spot color for reproducing the reproduction color and being determined based on predetermined ink amount conditions.

4. A color separation method for determining amounts of a plurality of color inks in order to reproduce an arbitrary color with the plurality of color inks on a printing medium, the method comprising the steps of:
   (a) defining an ink set that includes as useable inks a plurality of chromatic primary color inks that when used in combination can reproduce achromatic color, and at least one spot color ink of hue different from any of the plurality of chromatic primary color inks;

(b) determining a plurality of reproduction colors to be reproduced on a print medium according to a plurality of input colors within a chromatic primary color space, a term "reproduction color" denoting a color to be reproduced on the print medium according to any one input color, a term "color separation ink amount set" denoting a combination of ink amounts of the ink set for reproducing a reproduction color on the print medium, a term "chromatic primary color space" denoting a color space having base vectors representing ink amounts of the plurality of chromatic primary color inks; and (c) determining a plurality of color separation ink amount sets for reproducing the plurality of reproduction colors, wherein the step (c) includes, for each reproduction color, the steps of:

(c1) calculating a color saturation parameter value correlated to saturation of the reproduction color; and (c2) adjusting an ink amount of the spot color ink in the color separation ink amount set for the reproduction color such that the ink amount of the spot color ink decreases as the saturation parameter value changes in a direction of lower saturation when the color saturation parameter value falls within a prescribed first low-saturation range that is close to achromaticity, and wherein in the step (c2), when the reproduction color satisfies prescribed conditions that include a condition that the saturation parameter value falls in a second low-saturation range that is close to achromaticity and that is at least part of the first low-saturation range, the spot color ink amount in the color separation ink amount set for the reproduction color is adjusted to be zero, and when the saturation parameter value falls within the second low-saturation range, the spot color ink amount in the color separation ink amount set is adjusted to be a value larger than zero when the reproduction color is relatively dark, and is adjusted to be zero when the reproduction color is relatively light.

5. A color separation method for determining amounts of a plurality of color inks in order to reproduce an arbitrary color with the plurality of color inks on a printing medium, the method comprising the steps of:

(a) defining an ink set that includes as useable inks a plurality of chromatic primary color inks that when used in combination can reproduce achromatic color, and at least one spot color ink of hue different from any of the plurality of chromatic primary color inks;

(b) determining a plurality of reproduction colors to be reproduced on a print medium according to a plurality of input colors within a chromatic primary color space, a term "reproduction color" denoting a color to be reproduced on the print medium according to any one input color, a term "color separation ink amount set" denoting a combination of ink amounts of the ink set for reproducing a reproduction color on the print medium, a term "chromatic primary color space" denoting a color space having base vectors representing ink amounts of the plurality of chromatic primary color inks; and (c) determining a plurality of color separation ink amount sets for reproducing the plurality of reproduction colors, wherein the step (c) includes, for each reproduction color, the steps of:

(c1) calculating a color saturation parameter value correlated to saturation of the reproduction color; and (c2) adjusting an ink amount of the spot color ink in the color separation ink amount set for the reproduction color such that the ink amount of the spot color ink decreases as the saturation parameter value changes in a direction of lower saturation when the color saturation parameter value falls within a prescribed first low-saturation range that is close to achromaticity, wherein the step (c2) includes the steps of:

(c2-1) calculating a temporary ink amount of the spot color ink based on the saturation parameter value;

(c2-2) determining temporary ink amounts for the chromatic primary color inks which in conjunction with the temporary ink amount of the spot color ink are needed to reproduce the reproduction color, thereby obtaining a temporary ink amount set; and (c2-3) adopting the temporary ink amount set per se as the color separation ink amount set when the temporary ink amount set is within ink duty limit which limits an upper value of ink amount useable per unit of area of the print medium, and when the temporary ink amount set exceeds the ink duty limit, correcting the temporary ink amount set so as to meet the ink duty limit to determine the color separation ink amount set, and wherein the step (c2-1) includes the steps of:

(c2-1-1) determining a reference color separation ink amount for the spot color ink in order to reproduce the reproduction color; and (c-1-2) when the saturator parameter value falls within a third low-saturation range that is close to achromaticity and that is at least part of the first low-chromaticity range, adjusting a ratio of the spot color ink temporary ink amount to the reference color separation ink amount to be zero.

6. A color separation method for determining amounts of a plurality of color inks in order to reproduce an arbitrary color with the plurality of color inks on a printing medium, the method comprising the steps of:

(a) defining an ink set that includes as useable inks a plurality of chromatic primary color inks that when used in combination can reproduce achromatic color, and at least one spot color ink of hue different from any of the plurality of chromatic primary color inks;

(b) determining a plurality of reproduction colors to be reproduced on a print medium according to a plurality of input colors within a chromatic primary color space, a term "reproduction color" denoting a color to be reproduced on the print medium according to any one input color, a term "color separation ink amount set" denoting a combination of ink amounts of the ink set for reproducing a reproduction color on the print medium, a term "chromatic primary color space" denoting a color space having base vectors representing ink amounts of the plurality of chromatic primary color inks; and (c) determining a plurality of color separation ink amount sets for reproducing the plurality of reproduction colors, wherein the step (c) includes, for each reproduction color, the steps of:

(c1) calculating a color saturation parameter value correlated to saturation of the reproduction color; and (c2) adjusting an ink amount of the spot color ink in the color separation ink amount set for the reproduction color such that the ink amount of the spot color ink decreases as the saturation parameter value changes in a direction of lower saturation when the color saturation parameter value falls within a prescribed first low-saturation range that is close to achromaticity, and wherein the saturation parameter value represents a difference between a largest and a smallest value of ink amounts for the chromatic primary color inks when the input color or the reproduction color is to be reproduced by the chromatic primary inks alone.

7. A color separation method for determining amounts of a plurality of color inks in order to reproduce an arbitrary color with the plurality of color inks on a printing medium, the method comprising the steps of:
(a) defining an ink set that includes as useable inks a plurality of chromatic primary color inks that when used in combination can reproduce achromatic color, and at least one spot color ink of hue different from any of the plurality of chromatic primary color inks;
(b) determining a plurality of reproduction colors to be reproduced on a print medium according to a plurality of input colors within a chromatic primary color space, a term "reproduction color" denoting a color to be reproduced on the print medium according to any one input color, a term "color separation ink amount set" denoting a combination of ink amounts of the ink set for reproducing a reproduction color on the print medium, a term "chromatic primary color space" denoting a color space having base vectors representing ink amounts of the plurality of chromatic primary color inks; and
(c) determining a plurality of color separation ink amount sets for reproducing the plurality of reproduction colors, wherein the step (c) includes, for each reproduction color, the steps of:
(c1) calculating a color saturation parameter value correlated to saturation of the reproduction color; and
(c2) adjusting an ink amount of the spot color ink in the color separation ink amount set for the reproduction color such that the ink amount of the spot color ink decreases as the saturation parameter value changes in a direction of lower saturation when the color saturation parameter value falls within a prescribed first low-saturation range that is close to achromaticity, and
wherein the spot color ink contains a colorant different from any of the multiple chromatic primary inks.

8. A color separation method for determining amounts of a plurality of color inks in order to reproduce an arbitrary color with the plurality of color inks on a printing medium, the method comprising the steps of:
(a) defining an ink set that includes as useable inks a plurality of chromatic primary color inks that when used in combination can reproduce achromatic color, and at least one spot color ink of hue different from any of the plurality of chromatic primary color inks;
(b) determining a plurality of reproduction colors to be reproduced on a print medium according to a plurality of input colors within a chromatic primary color space, a term "reproduction color" denoting a color to be reproduced on the print medium according to any one input color, a term "color separation ink amount set" denoting a combination of ink amounts of the ink set for reproducing a reproduction color on the print medium, a term "chromatic primary color space" denoting a color space having base vectors representing ink amounts of the plurality of chromatic primary color inks; and
(c) determining a plurality of color separation ink amount sets for reproducing the plurality of reproduction colors, wherein the step (c) includes, for each reproduction color, the steps of:
(c1) calculating a color saturation parameter value correlated to saturation of the reproduction color; and
(c2) adjusting an ink amount of the spot color ink in the color separation ink amount set for the reproduction color such that the ink amount of the spot color ink decreases as the saturation parameter value changes in a direction of lower saturation when the color saturation parameter value falls within a prescribed first low-saturation range that is close to achromaticity, and
wherein the spot color ink can reproduce a higher saturation than saturation that can be reproduced using a mixture of the plurality of chromatic primary color inks when the mixture is used to reproduce a hue reproducible by the spot color ink.

9. A method for printing in accordance with color image data, comprising the steps of:
(a) providing an ink set that includes a plurality of chromatic primary color inks that when used in combination can reproduce achromatic color, and at least one spot color ink of hue different from any of the plurality of chromatic primary color inks; and
(b) executing printing by causing ink to be discharged from a print head in accordance with color image data,
wherein the step (b) includes a step of controlling ink amounts discharged from the print head such that, when hue of the color image data is almost the same as hue of the spot color ink and saturation of the color image data is within a prescribed low-saturation range close to achromaticity, an ink amount for the spot color ink becomes smaller as the saturation and brightness of the color image data become lower.

10. A printing apparatus that performs printing in accordance with color image data, comprising:
an ink set mount configured to house an ink set that includes a plurality of chromatic primary color inks that when used in combination can reproduce achromatic color, and at least one spot color ink of hue different from any of the plurality of chromatic primary color inks;
a print head configured to discharge ink supplied from the ink set; and
a print controller configured to control ink discharge operation of the print head in accordance with color image data,
wherein the print controller controls ink amounts discharged from the print head such that, when hue of the color image data is almost the same as hue of the spot color ink and saturation of the color image data is within a prescribed low-saturation range close to achromaticity, an ink amount for the spot color ink becomes smaller as the saturation and brightness of the color image data become lower.

11. A method for printing comprising the step of:
performing printing of an image using an ink included in a plurality of inks having hues that are different from each other, wherein
the plurality of inks includes two chromatic primary color inks and a spot color ink, a hue of the spot color ink being a hue that can be reproduced by the two chromatic primary color inks, and
the performing includes the steps of:
(a) performing printing of the image using the spot color ink when a hue of the image is almost the same as a hue of the spot color ink and saturation of the image is within a prescribed high-saturation range; and
(b) performing printing of the image without using the spot color ink when the hue of the image is almost the same as the hue of the spot color ink and the saturation of the image is within a prescribed low-saturation range, the prescribed low-saturation range ranging from a value higher than achromatic color to a value lower than the prescribed high-saturation range.

12. A method for printing according to claim 11, wherein step (b) of the performing includes the step of:

performing printing of the image using the two chromatic primary color inks instead of the spot color ink when the hue of the image is almost the same as the hue of the spot color ink and the saturation of the image is within the prescribed low-saturation range.

13. A printing apparatus comprising:

a print controller configured to perform printing of an image using an ink included in a plurality of inks having hues that are different from each other, wherein the plurality of inks includes two chromatic primary color inks and a spot color ink, a hue of the spot color ink being a hue that can be reproduced by the two chromatic primary color inks, the print controller performs printing of the image using the spot color ink when a hue of the image is almost the same as a hue of the spot color ink and saturation of the image is within a prescribed high-saturation range, and the print controller performs printing of the image without using the spot color ink when the hue of the image is almost the same as the hue of the spot color ink and the saturation of the image is within a prescribed low-saturation range, the prescribed low-saturation range ranging from a value higher than achromatic color to a value lower than the prescribed high-saturation range.

14. A printing apparatus according to claim 13, wherein the print controller performs printing of the image using the two chromatic primary color inks instead of the spot color ink when the hue of the image is almost the same as the hue of the spot color ink and the saturation of the image is within the prescribed low-saturation range.

15. A method for printing in accordance with color image data, comprising the steps of:

(a) providing an ink set that includes a plurality of chromatic primary color inks that when used in combination can reproduce achromatic color, and at least one spot color ink of a hue different from any of the plurality of chromatic primary color inks; and (b) executing printing by causing ink to be discharged from a print head in accordance with color image data, wherein a hue of the spot color ink is a hue that can be reproduced by two chromatic primary color inks, and the step (b) includes a step of controlling ink amounts discharged from the print head such that an ink amount for the spot color ink decreases and at least one of two respective ink amounts of the two chromatic primary color inks increases as saturation of the color image data decreases when the saturation of the color image data is within a prescribed low-saturation range close to achromaticity.

16. A printing apparatus that performs printing in accordance with color image data, comprising:

an ink set amount configured to house an ink set that includes a plurality of chromatic primary color inks that when used in combination can reproduce achromatic color, and at least one spot color ink of a hue different from any of the plurality of chromatic primary color inks;

a print head configured to discharge ink supplied from the ink set; and a print controller configured to control ink discharge operation of the print head in accordance with color image data, wherein a hue of the spot color ink is a hue that can be reproduced by two chromatic primary color inks, and the print controller controls ink amounts discharged from the print head such that an ink amount for the spot color ink decreases and at least one of two respective ink amounts of the two chromatic primary color inks increases as saturation of the color image data decreases when the saturation of the color image data is within a prescribed low-saturation range close to achromaticity.

* * * * *